United States Patent
Lin et al.

(10) Patent No.: US 11,646,847 B2
(45) Date of Patent: May 9, 2023

(54) METHOD AND APPARATUS FOR REDUCED PDCCH MONITORING

(71) Applicant: Samsung Electronics Co., Ltd., Suwon-si (KR)

(72) Inventors: Qiongjie Lin, Sunnyvale, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 17/248,674

(22) Filed: Feb. 2, 2021

(65) Prior Publication Data

US 2021/0250153 A1     Aug. 12, 2021

Related U.S. Application Data

(60) Provisional application No. 63/138,244, filed on Jan. 15, 2021, provisional application No. 63/116,618, (Continued)

(51) Int. Cl.
  *H04L 5/00* (2006.01)
  *H04W 72/04* (2009.01)
  *H04W 72/0446* (2023.01)

(52) U.S. Cl.
  CPC .......... *H04L 5/0053* (2013.01); *H04L 5/0094* (2013.01); *H04W 72/042* (2013.01); *H04W 72/0446* (2013.01)

(58) Field of Classification Search
  CPC .. H04L 5/0053; H04L 5/0094; H04W 72/042; H04W 72/0446
  See application file for complete search history.

(56) References Cited

U.S. PATENT DOCUMENTS

| | | |
|---|---|---|
| 2019/0335425 A1 | 10/2019 | Seo et al. |
| 2020/0015240 A1 | 1/2020 | Lee et al. |
| 2020/0029330 A1 | 1/2020 | Nam et al. |

FOREIGN PATENT DOCUMENTS

| | | | | |
|---|---|---|---|---|
| EP | 4009555 A1 | * | 6/2022 | ............ H04W 24/08 |
| WO | WO-2021086084 A1 | * | 5/2021 | |
| WO | WO-2021161266 A1 | * | 8/2021 | |

OTHER PUBLICATIONS

Fady Nabil et al., 'Search Space Allocation Schemes Review for Control Channels in LTE and LTE-Advanced', 2016 10th International Conference on Next Generation Mobile Applications, Security and Technologies, pp. 30-34. (Year: 2016).*

(Continued)

*Primary Examiner* — Melvin C Marcelo

(57) ABSTRACT

Methods and apparatuses for reduced physical downlink control channel (PDCCH) monitoring in a wireless communication system. A method for operating a user equipment includes receiving a configuration for one or more search space sets. The one or more search space sets provide parameters for one or more candidate PDCCH receptions. The method includes determining a first number of candidate PDCCH receptions for a first number of more than one consecutive slots. A candidate PDCCH reception is over a number of control channel elements (CCEs). The first number of candidate PDCCH receptions over a corresponding number of CCEs does not exceed a capability corresponding to the first number of more than one consecutive slots for a maximum number of candidate PDCCH receptions over a corresponding maximum number of non-overlapped CCEs. The method further includes receiving the first number of candidate PDCCH receptions.

20 Claims, 11 Drawing Sheets

Related U.S. Application Data filed on Nov. 20, 2020, provisional application No. 63/075,552, filed on Sep. 8, 2020, provisional application No. 62/972,328, filed on Feb. 10, 2020.

(56) References Cited

OTHER PUBLICATIONS

"3rd Generation Partnership Project; Technical Specification Group Radio Access Network; NR; Physical channels and modulation (Release 16)", 3GPP TS 38.211 v16.4.0, Dec. 2020, 133 pgs.
"3rd Generation Partnership Project; Technical Specification Group Radio Access Network; NR; Multiplexing and channel coding (Release 16)", 3GPP TS 38.212 v16.4.0, Dec. 2020, 152 pgs.
"3rd Generation Partnership Project; Technical Specification Group Radio Access Network; NR; Physical layer procedures for control (Release 16)", 3GPP TS 38.213 v16.4.0, Dec. 2020, 181 pgs.
"3rd Generation Partnership Project; Technical Specification Group Radio Access Network; NR; Physical layer procedures for data (Release 16)", 3GPP TS 38.214 v16.4.0, Dec. 2020, 169 pgs.
"5G; NR; Medium Access Control (MAC) protocol specification (3GPP TS 38.321 version 16.1.0 Release 16)", ETSI TS 138 321 V16.1.0, Jul. 2020, 153 pgs.
"5G; NR; Radio Resource Control (RRC); Protocol specification (3GPP TS 38.331 version 16.2.0 Release 16)", ETSI TS 138 331 V16.2.0, Nov. 2020, 908 pgs.
International Search Report of the International Searching Authority in connection with International Application No. PCT/KR2021/001749 dated Apr. 27, 2021, 3 pages.
3GPP TS 38.213 V16.0.0 (Dec. 2019), Technical Specification, 3rd Generation Partnership Project; Technical Specification Group Radio Access Network; NR; Physical layer procedures for control (Release 16) Dec. 2019, 146 pages.
Kazuki Takeda et al., "Understanding the Heart of the 5G Air Interface: An Overview of Physical Downlink Control Channel for 5G New Radio (NR)", Computer Science, Networking and Internet Architecture, Oct. 3, 2019, 9 pages.

* cited by examiner

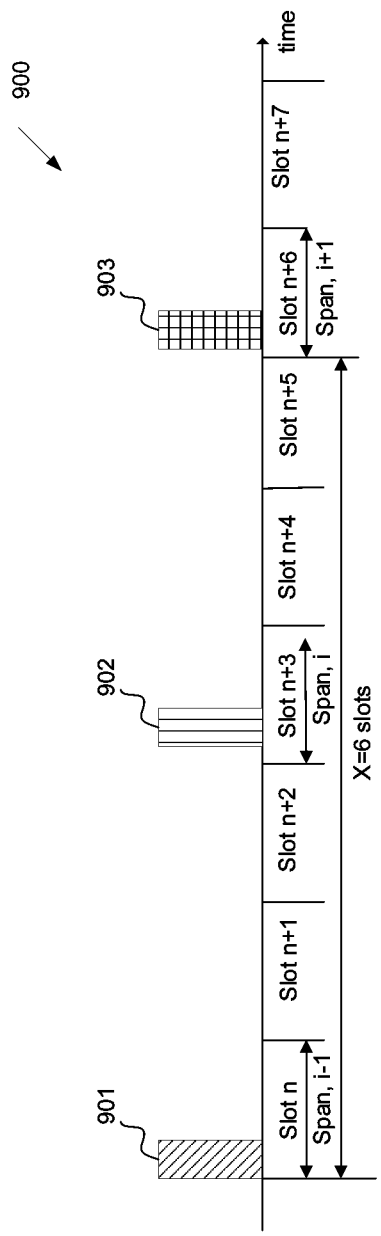
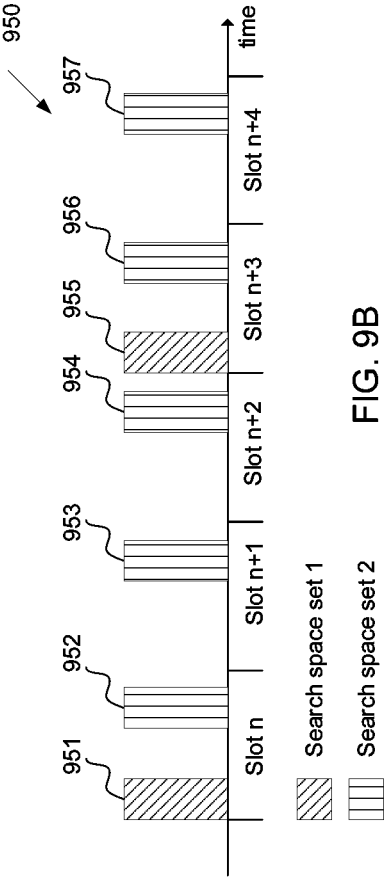
FIG. 9A
FIG. 9B

METHOD AND APPARATUS FOR REDUCED PDCCH MONITORING

CROSS-REFERENCE TO RELATED APPLICATIONS AND CLAIM OF PRIORITY

The present application claims priority to: U.S. Provisional Patent Application No. 62/972,328, filed on Feb. 10, 2020; U.S. Provisional Patent Application No. 63/075,552, filed on Sep. 8, 2020; U.S. Provisional Patent Application No. 63/116,618, filed on Nov. 20, 2020; and U.S. Provisional Patent Application No. 63/138,244, filed on Jan. 15, 2021. The contents of the above-identified patent documents are incorporated herein by reference.

TECHNICAL FIELD

The present disclosure relates generally to wireless communication systems and, more specifically, the present disclosure relates to reduced physical downlink control channel (PDCCH) monitoring in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to reduced PDCCH monitoring in a wireless communication system.

In one embodiment, a user equipment (UE) is provided. The UE includes a transceiver configured to receive a configuration for one or more search space sets. The one or more search space sets provide parameters for one or more candidate PDCCH receptions. The UE further includes a processor operably connected to the transceiver. The processor is configured to determine a first number of candidate PDCCH receptions for a first number of more than one consecutive slots. A candidate PDCCH reception is over a number of control channel elements (CCEs). The first number of candidate PDCCH receptions over a corresponding number of CCEs does not exceed a capability corresponding to the first number of more than one consecutive slots for a maximum number of candidate PDCCH receptions over a corresponding maximum number of non-overlapped CCEs. The transceiver is further configured to receive the first number of candidate PDCCH receptions.

In another embodiment, a base station (BS) is provided. The BS includes a transceiver configured to transmit a configuration for one or more search space sets. The one or more search space sets provide parameters for one or more candidate PDCCH transmissions. The BS further includes a processor operably connected to the transceiver. The processor is configured to determine a first number of candidate PDCCH transmissions for a first number of more than one consecutive slots. A candidate PDCCH transmission is over a number of CCEs. The first number of candidate PDCCH transmissions over a corresponding number of CCEs does not exceed a capability corresponding to the first number of more than one consecutive slots for a maximum number of candidate PDCCH transmissions over a corresponding maximum number of non-overlapped CCEs. The transceiver is further configured to transmit the first number of candidate PDCCH transmission.

In yet another embodiment, a method for operating a UE is provided. The method includes receiving a configuration for one or more search space sets. The one or more search space sets provide parameters for one or more candidate PDCCH receptions. The method includes determining a first number of candidate PDCCH receptions for a first number of more than one consecutive slots. A candidate PDCCH reception is over a number of CCEs. The first number of candidate PDCCH receptions over a corresponding number of CCEs does not exceed a capability corresponding to the first number of more than one consecutive slots for a maximum number of candidate PDCCH receptions over a corresponding maximum number of non-overlapped CCEs. The method further includes receiving the first number of candidate PDCCH receptions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates an example PDCCH monitoring occasions from two configured search space sets according to embodiments of the present disclosure;

FIG. 9B illustrates an example PDCCH monitoring occasions from two configured search space sets according to embodiments of the present disclosure.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.1.0, "NR; Medium Access Control (MAC) protocol specification"; and 3GPP TS 38.331 v16.2.0, "NR; Radio Resource Control (RRC) Protocol Specification."

Figure 1:
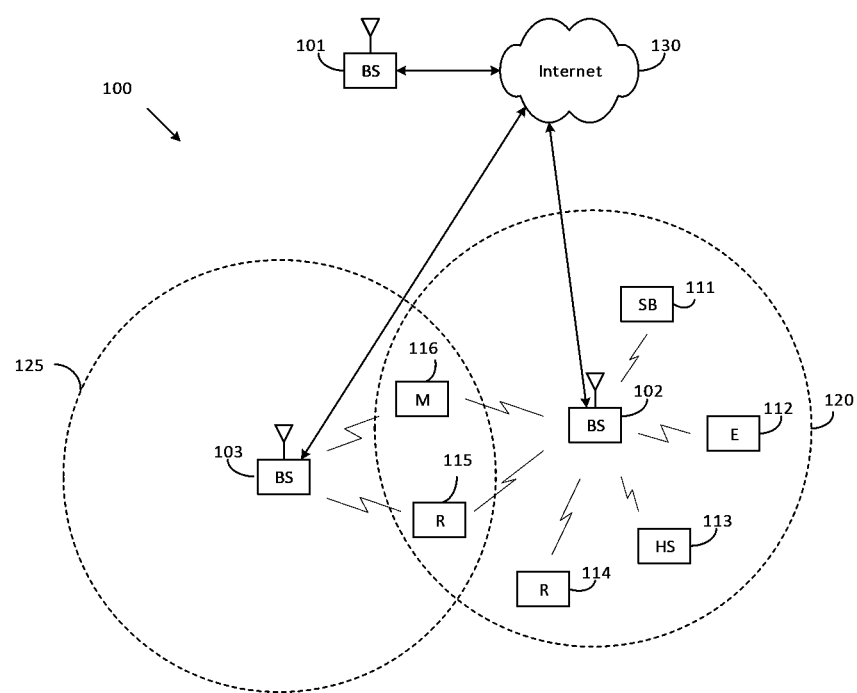
FIG. 1 illustrates an example wireless network according to embodiments of the present disclosure.
Figure 2:
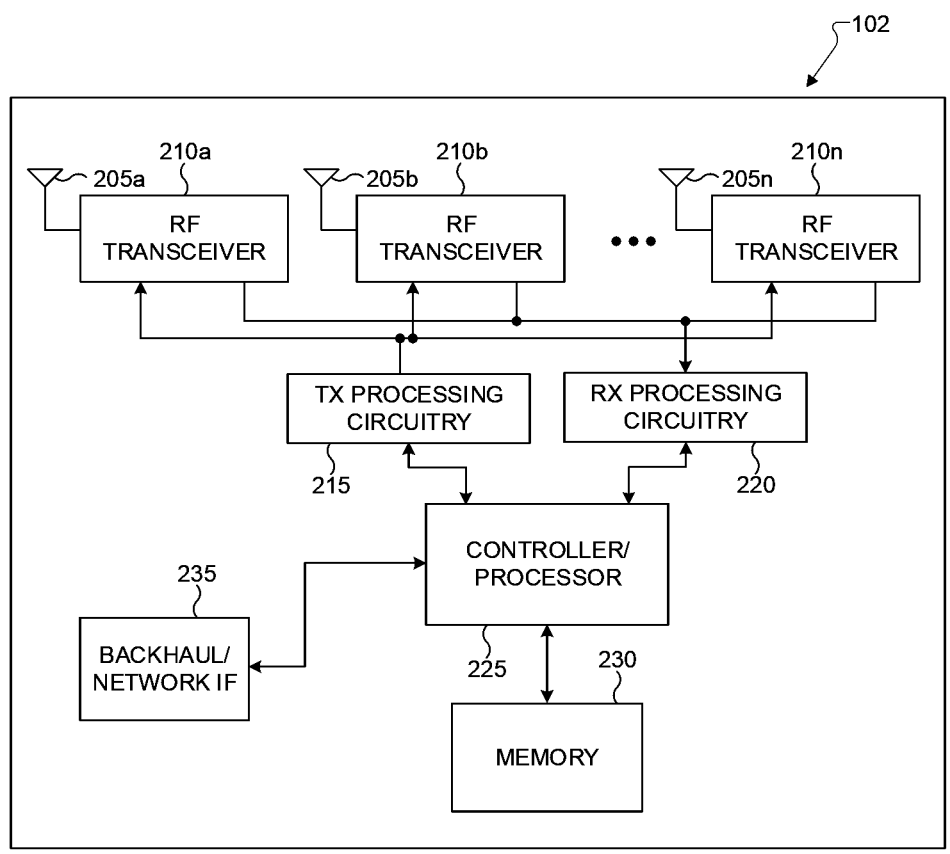
FIG. 2 illustrates an example gNB according to embodiments of the present disclosure.
Figure 3:
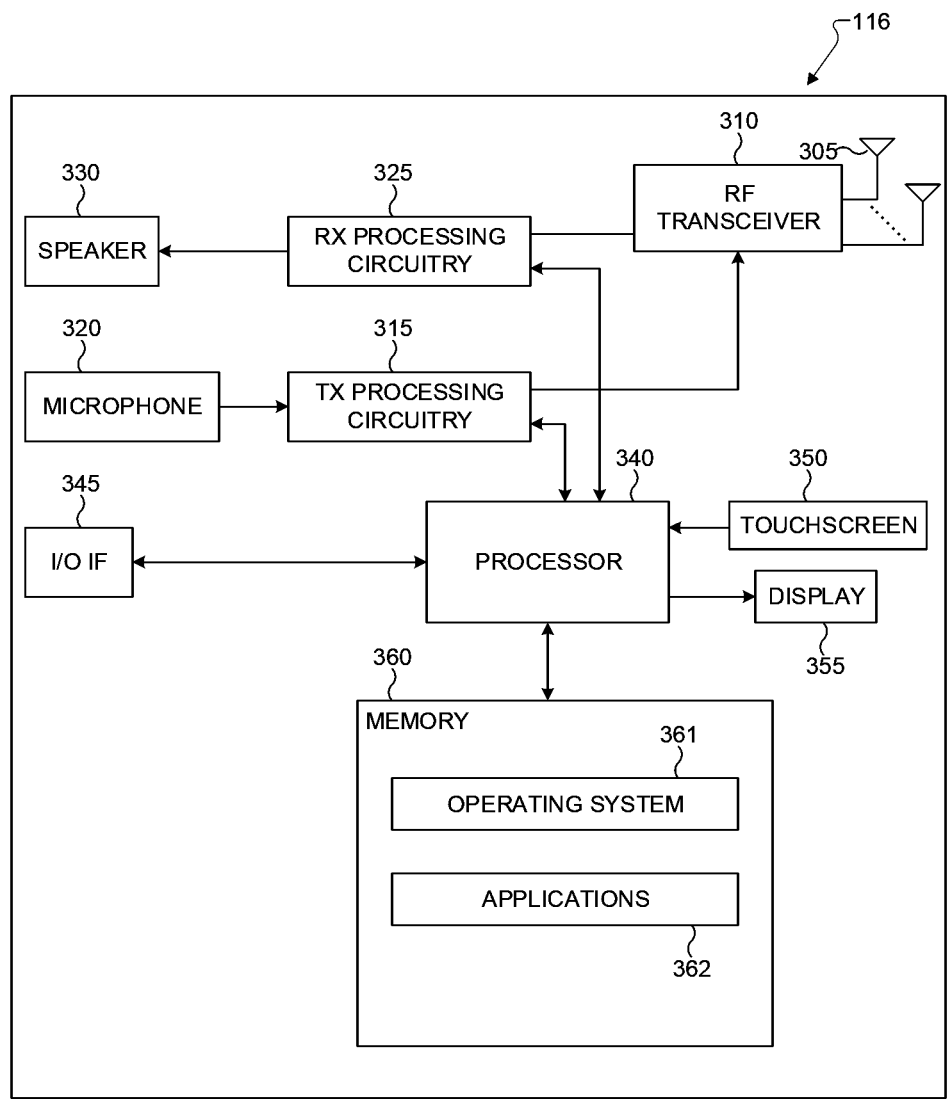
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "gNB" can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP)

and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reduced PDCCH monitoring in a wireless communication system. In certain embodiments, and one or more of the gNBs 101-103 includes circuitry, programing, or a combination thereof, for reduced PDCCH monitoring in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support reduced PDCCH monitoring in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reduced PDCCH monitoring in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
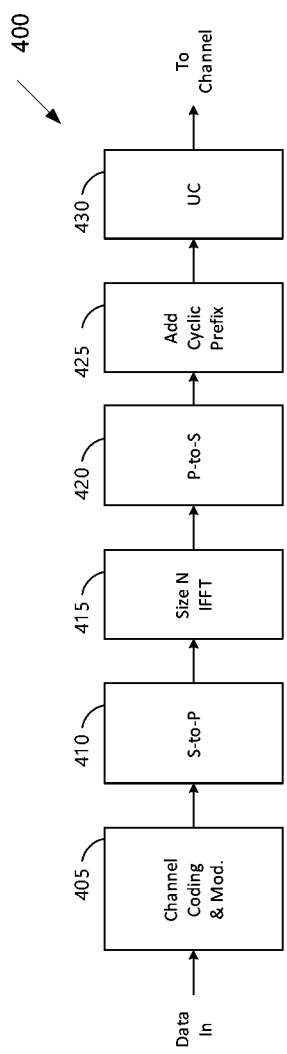
FIGS. 4 and 5 illustrate example wireless transmit and receive paths according to this disclosure.
Figure 5:
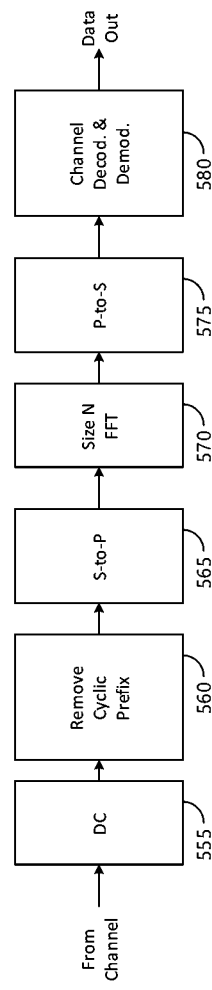

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

NR supports transmission and reception based on higher layer configurations, such as radio resource control (RRC) signaling, as described in NR specifications.

A semi-persistent scheduling (SPS) of PDSCH receptions is configured by RRC per serving cell and per bandwidth part (BWP). Multiple assignments can be active simultaneously in the same BWP. Activation and deactivation of SPS PDSCH receptions are independent among the serving cells.

For a SPS PDSCH reception, a DL assignment is provided to a UE by a PDCCH and the UE stores or clears the DL assignment based on whether the DL assignment indicates SPS PDSCH activation or deactivation, respectively.

RRC configures the following parameters when the SPS PDSCH is configured: (1) configured scheduling radio network temporary identifier (cs-RNTI): CS-RNTI for activation, deactivation, and retransmission; (2) nrofHARQ-Processes: the number of configured hybrid automatic repeat request (HARQ) processes for SPS PDSCH; (3) harq-ProcID-Offset: Offset of HARQ process for SPS PDSCH; and/or (4) periodicity: periodicity of configured downlink assignment for SPS PDSCH.

When an SPS PDSCH is released by upper layers, the UE releases all the corresponding configurations After a downlink assignment is configured for SPS PDSCH, the MAC entity may consider sequentially that the Nth downlink assignment occurs in the slot for which: (numberOfSlotsPerFrame×SFN+slot number in the frame)=[(numberOfSlotsPerFrame×SFNstart time+slotstart time)+N×periodicity×numberOfSlotsPerFrame/10] modulo (1024×numberOfSlotsPerFrame) where SFNstart time and slotstart time are the SFN and slot, respectively, of the first transmission of PDSCH where the configured downlink assignment was (re-)initialized.

There are three types of a PUSCH transmission without dynamic grant: (1) configured grant Type 1 where an uplink grant is provided by RRC, and stored as configured uplink grant; (2) configured grant Type 2 where an uplink grant is provided by PDCCH, and stored or cleared as configured uplink grant based on L1 signalling indicating configured uplink grant activation or deactivation; and (3) retransmissions on a stored configured uplink grant of Type 1 or Type 2 configured with cg-RetransmissionTimer.

Type 1 and Type 2 are configured by RRC per serving cell and per BWP. Multiple configurations can be active simultaneously in the same BWP. For Type 2, activation and deactivation are independent among the serving cells. For the same BWP, the MAC entity can be configured with both Type 1 and Type 2.

RRC configures the following parameters when the configured grant Type 2 is configured: (1) cs-RNTI: CS-RNTI for activation, deactivation, and retransmission; (2) periodicity: periodicity of the configured grant Type 2; (3) nrof-HARQ-Processes: the number of HARQ processes for configured grant; (4) harq-ProcID-Offset: offset of HARQ process for configured grant for operation with shared spectrum channel access; and/or (5) harq-ProcID-Offset2: offset of HARQ process for configured grant.

RRC configures the following parameters when retransmissions on configured uplink grant is configured: cg-Retransmission Timer: the duration after a configured grant (re)transmission of a HARQ process when the UE may not autonomously retransmit that HARQ process.

After an uplink grant is configured for a configured grant Type 2, the MAC entity may consider sequentially that the $N^{th}$ uplink grant occurs in the symbol for which: [(SFN×numberOfSlotsPerFrame×numberOfSymbolsPerSlot)+(slot number in the frame×numberOfSymbolsPerSlot)+symbol number in the slot] [(SFN$_{start\ time}$×numberOfSlotsPerFrame×numberOfSymbolsPerSlot+slot$_{start\ time}$×numberOfSymbolsPerSlot+symbol$_{start\ time}$)+N×periodicity] modulo (1024×numberOfSlotsPerFrame×numberOfSymbolsPerSlot) where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised.

When the configured uplink grant is released by upper layers, all the corresponding configurations may be released and all corresponding uplink grants may be cleared.

For a configured grant Type 2, the MAC entity may clear the configured uplink grant(s) immediately after first transmission of configured grant confirmation MAC CE or Multiple Entry configured grant confirmation MAC CE which confirms the configured uplink grant deactivation.

Retransmissions are done by: (1) repetition of configured uplink grants; (2) receiving uplink grants addressed to CS-RNTI; or (3) retransmission on configured uplink grants.

The present disclosure relates to a pre-5G or 5G communication system to be provided for supporting higher data rates beyond 4G communication system such as LTE. The disclosure relates to determining maximum number of monitored PDCCH candidates per span and maximum number of non-overlapped CCEs per span with respect to an operation bandwidth for a UE. The disclosure additionally relates to adaptation on a maximum number of monitored PDCCH candidates per span in an active DL BWP by a UE based on an indication from a gNB to a UE. The disclosure also related to determination of a minimum PDCCH monitoring gap. The disclosure further related to determination of a maximum PDCCH monitoring span. This disclosure finally relates to search space set switching triggered by a DCI format based on a UE-specific search space (USS).

UE power savings is one of the key performance indicators (KPIs) for use cases such as wearables, including smart watches, rings, eHealth related devices, medical monitoring devices, and so on. To avoid a UE performing unnecessary PDCCH monitoring, it is beneficial to support dynamic adaptation on a maximum number of PDCCH candidates or a maximum number of non-overlapping CCEs per slot, and on a PDCCH monitoring periodicity, according to real-time traffic.

For adaptation PDCCH monitoring periodicity, an associated signaling overhead can be large if an adaptation on PDCCH monitoring periodicity is per search space set when the UE is configured multiple search space sets. Instead of adaptation on PDCCH monitoring periodicity per search space set, it can be beneficial in terms of signaling overhead to adapt a minimum time separation between consecutive PDCCH monitoring occasions and this minimum time separation can be applicable to all configured search space sets. Such adaptation can be applicable only for the primary cell (PCell) or for all configured cells.

Further, for a UE configured for operation with carrier aggregation, when the UE is indicated an increase in minimum time separation between consecutive PDCCH monitoring occasions, or an increase in PDCCH monitoring periodicity, the increase can be applicable only for the PCell and can serve as an implicit indication for the UE to stop PDCCH monitoring for search space sets associated with scheduling on secondary cells (SCells). Similar, a decrease in minimum time separation between consecutive PDCCH monitoring occasions, or a decrease in PDCCH monitoring periodicity, the increase can serve as an implicit indication for the UE to start PDCCH monitoring for search space sets associated with scheduling on SCells.

NR Rel-16 supports adaptation on cross-slot scheduling by indicating a minimum applicable value for K0 that denotes a number of slots for a PDSCH reception in a slot after a slot of a corresponding PDCCH reception. However, even when a minimum applicable value for K0 is larger than zero, a UE may not be able to achieve a power saving gain compared to when K0 is 0. Although the UE can skip buffering PDSCH samples when K0>0, the UE cannot apply micro-sleep when multiple PDCCH monitoring occasions are configured between a PDCCH reception with a DCI format scheduling a PDSCH reception and the PDSCH reception, similar to the UE not being able to apply micro-sleep due to the PDCCH monitoring occasions when there is no PDSCH reception.

Therefore, there is a need to support a determination of a maximum number of monitored PDCCH candidates per span and a maximum number of non-overlapped CCEs per span with respect to an operating bandwidth for a UE.

There is another need to support adaptation of a maximum number of monitored PDCCH candidates per span in an active DL BWP by a UE based on an indication from a gNB to the UE.

There is yet another need to support determination a minimum PDCCH monitoring gap and maximum PDCCH monitoring span with feasibility to reduce PDCCH monitoring overhead.

There is yet another need to support search space set switching triggered by a DCI format based on a USS.

In one embodiment, a determination operation is provided for a maximum number of monitored PDCCH candidates per span by a UE in an active DL BWP with SCS configuration $\mu$ for PDCCH receptions, $M_{PDCCH,BWP}^{max,span,\mu}$, and for a maximum number of non-overlapped CCEs per span in an active DL BWP with SCS configuration $\mu$ for PDCCH receptions, $M_{PDCCH,BWP}^{max,span,\mu}$.

In such embodiment, a span can be defined as one of: (1) a number of consecutive symbols in a slot where UE is configured to monitor PDCCH, wherein the span starts at a first symbol where a PDCCH monitoring occasion starts and ends at a last symbol where a PDCCH monitoring occasion ends; (2) a slot where UE is configured to monitor PDCCH in the slot; or (3) a number of consecutive slots where UE is configured to monitor PDCCH, wherein the span starts at a first slot where a PDCCH monitoring occasion starts and ends at a last slot where a PDCCH monitoring occasion ends.

$M_{PDCCH}^{max,span,\mu}$ is used to determine the maximum number of blind decoding (BD), while $C_{PDCCH}^{max,span,\mu}$ is used to determine the maximum non-overlapping CCEs in applicable search space sets. A UE does not expect to decode more than $M_{PDCCH}^{max,slot,\mu}$ PDCCH candidates in applicable search space sets per span. A UE does not expect to perform channel estimation for more than $C_{PDCCH}^{max,span,\mu}$ non-overlapping CCEs in applicable search space sets per span. $M_{PDCCH,BWP}^{max,span,\mu}$ or $C_{PDCCH,BWP}^{max,span,\mu}$ can be applied to PDCCH monitoring in one or more search space sets.

The one or more search space sets can be one of the following: (1) all configured search space sets; (2) a sub-group of search space sets from a group of configured search space sets. For example, the applicable search space sets can be any configured UE-specific search space (USS) sets; or (3) UE-specific search space sets.

In one example for determining $M_{PDCCH}^{max,span,\mu}$ or $C_{PDCCH}^{max,span,\mu}$; $M_{PDCCH}^{max,span,\mu}$ or $C_{PDCCH}^{max,span,\mu}$ can be derived based on a predefined association between $M_{PDCCH}^{max,span,\mu}/C_{PDCCH}^{max,span,\mu}$ and a predetermined BW, $N_{BW}^{UE}$.

In one example of the association between $M_{PDCCH}^{max,span,\mu}$ and $N_{BW}^{UE}$, $$M_{PDCCH}^{max,span,\mu} = \left\lfloor (M0_{PDCCH}^{max,span,\mu} - M_{CSS}^{max,span,\mu}) \cdot \frac{N_{BW}^{UE}}{N_{BW}^{0}} + M_{CSS}^{max,span,\mu} \right\rfloor.$$

In another example of the association between $C_{PDCCH}^{max,span,\mu}$ and $N_{BW}^{UE}$, $$C_{PDCCH}^{max,span,\mu} = \left\lfloor (C0_{PDCCH}^{max,span,\mu} - C_{css}^{max,span,\mu}) \cdot \frac{N_{BW}^{UE}}{N_{BW}^{0}} + C_{css}^{max,span,\mu} \right\rfloor.$$

In yet another example of the association between $M_{PDCCH}^{max,span,\mu}$ and $N_{BW}^{UE}$, $$M_{PDCCH}^{max,span,\mu} = \max\left\{ \left\lfloor (M0_{PDCCH}^{max,span,\mu} - M_{CSS}^{max,span,\mu}) \cdot \frac{N_{BW}^{UE}}{N_{BW}^{0}} + M_{CSS}^{max,span,\mu} \right\rfloor, M^{min,span,\mu} \right\}.$$

In yet another example of the association between $C_{PDCCH}^{max,span,\mu}$ and $N_{BW}^{UE}$, $$C_{PDCCH}^{max,span,\mu} = \max\left\{ \left\lfloor (C0_{PDCCH}^{max,span,\mu} - C_{css}^{max,span,\mu}) \cdot \frac{N_{BW}^{UE}}{N_{BW}^{0}} + C_{css}^{max,span,\mu} \right\rfloor, C^{min,span,\mu} \right\}.$$

In yet another example of the association between $M_{PDCCH}^{max,span,\mu}$ and $$M_{PDCCH}^{max,span,\mu} = \left\lfloor (M0_{PDCCH}^{max,span,\mu} - M_{CSS}^{max,span,\mu}) \cdot \frac{N_{BW}^{UE}}{N_{BW}^{0}} \right\rfloor + M_{CSS}^{max,span,\mu}.$$

In yet another example of the association between $C_{PDCCH}^{max,span,\mu}$ and $N_{BW}^{UE}$, $$C_{PDCCH}^{max,span,\mu} = \left\lfloor (C0_{PDCCH}^{max,span,\mu} - C_{css}^{max,span,\mu}) \cdot \frac{N_{BW}^{UE}}{N_{BW}^{0}} \right\rfloor + C_{css}^{max,span,\mu}.$$

In yet another example of the association between $M_{PDCCH}^{max,span,\mu}$ and $N_{BW}^{UE}$, $$M_{PDCCH}^{max,span,\mu} = \left\lfloor (M0_{PDCCH}^{max,span,\mu}) \cdot \frac{N_{BW}^{UE}}{N_{BW}^{0}} \right\rfloor.$$

In yet another example of the association between $C_{PDCCH}^{max,span,\mu}$ and $N_{BW}^{UE}$, $$C_{PDCCH}^{max,span,\mu} = \left\lfloor (C0_{PDCCH}^{max,span,\mu}) \cdot \frac{N_{BW}^{UE}}{N_{BW}^{0}} \right\rfloor.$$

In the aforementioned examples, $M0_{PDCCH}^{max,span,\mu}$ is the maximum number of monitored PDCCH candidates per span for the DL BWP with SCS configuration $\mu$ with respect to a reference BW; $M_{CSS}^{max,span,\mu}$ is the maximum number of monitored PDCCH candidates per span in common search space for the DL BWP with SCS configuration $\mu$; $C0_{PDCCH}^{max,span,\mu}$ is the maximum number of non-overlapped CCEs per span for a DL BWP with SCS configuration, $\mu$, with respect to a reference BW; $C0_{CSS}^{max,span,\mu}$ is the maximum number of non-overlapped CCEs per span in common search space for the DL BWP with SCS configuration, $\mu$; $N_{BW}^0$ is the reference BW; $N_{BW}^0$ can be predefined in the specification of the system operation, for example, $N_{BW}^0$=100 MHz or 20 MHz or be configured to a UE by a gNB through higher layer signaling; $M^{min,span,\mu}$ is the minimum number of monitored PDCCH candidates per span for the DL BWP with SCS configuration $\mu$; and $C^{min,span,\mu}$ is the minimum number of non-overlapped CCEs per span for a DL BWP with SCS configuration, $\mu$.

The UE can determine, $N_{BW}^{UE}$, through any of the following: (1) $N_{BW}^{UE}$ is a maximum UE operating BW that the UE reports to a serving gNB as part of a UE capability; (2) $N_{BW}^{UE}$ is the BW of an active DL BWP; (3) $N_{BW}^{UE}$ is a maximum BW among the BWs of all configured CORESETs with corresponding search space sets having non-zero PDCCH candidates in an active DL BWP; and/or (4) $N_{BW}^{UE}$ is from a set of predetermined BWs, or from a set of BWs indicated by the UE through a capability signaling, and is determined as a smallest BW from the set of BWs that is larger than or equal to a BW of an active DL BWP.

Figure 6:
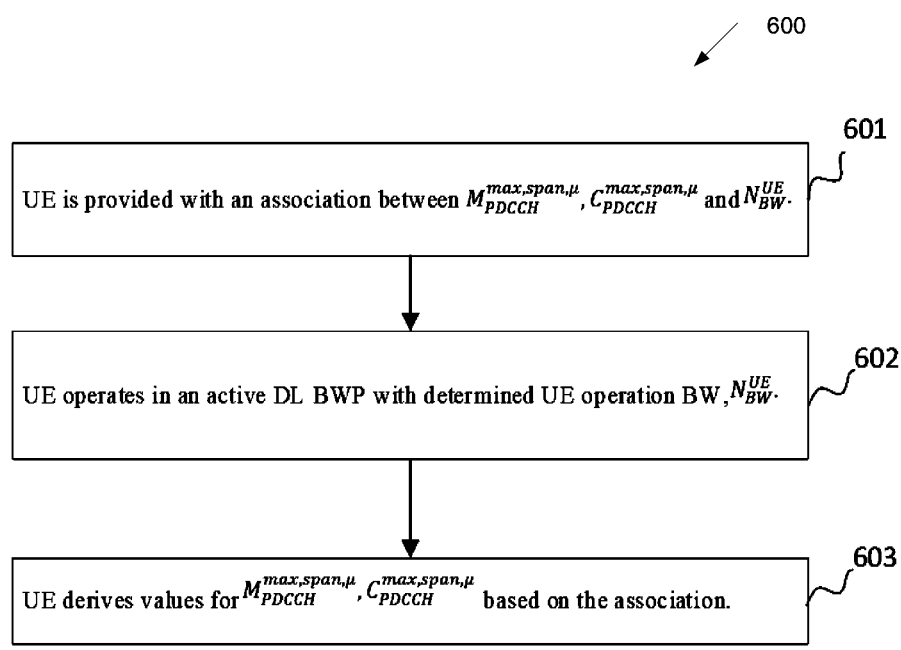
FIG. 6 illustrate a flowchart of a method for determining $M_{PDCCH}^{max,slot,\mu}$ and $C_{PDCCH}^{max,slot,\mu}$ with respect to a BW $N_{BW}^{UE}$ for a DL BWP with SCS configuration $\mu$ according to embodiments of the present disclosure.

FIG. 6 illustrate a flowchart of a method 600 for determining $M_{PDCCH}^{max,span,\mu}$ and $C_{PDCCH}^{max,span,\mu}$ with respect to a BW $N_{BW}^{UE}$ for a DL BWP with SCS configuration $\mu$ according to embodiments of the present disclosure. An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. For example, the method 600 may be performed by a UE such as the UE 116 in FIG. 1.

As illustrated in FIG. 6, a UE is provided with an association or a scaling rule between $M_{PDCCH}^{max,span,\mu}$, $C_{PDCCH}^{max,span,\mu}$ and $N_{BW}^{UE}$, at step 601. The association can be predefined in the specification of system operation. The UE operates in an active DL BWP with UE operating BW, for example $N_{BW}^{UE}$ is the operating BW of the active DL BWP, at step 602. The UE derives the values for $M_{PDCCH}^{max,span,\mu}$, $C_{PDCCH}^{max,span,\mu}$ based on the predefined association, at step 603.

In one example for determining $M_{PDCCH}^{max,span,\mu}$ or $C_{PDCCH}^{max,span,\mu}$ for a DL BWP with SCS configuration $\mu$, a UE can be provided a configuration of $M_{PDCCH}^{max,span,\mu}$ and $C_{PDCCH,BWP}^{max,span,\mu}$ for the DL BWP. If for an active DL BWP a UE is configured with values for $M_{PDCCH,BWP}^{max,span,\mu}$ and $C_{PDCCH,BWP}^{max,span,\mu}$, the UE determines the value for $M_{PDCCH}^{max,span,\mu}$ and $C_{PDCCH}^{max,span,\mu}$ to be same as the respective configured values for the active DL BWP; otherwise, the UE applies predetermined default values for $M_{PDCCH}^{max,span,\mu}$ and $C_{PDCCH}^{max,span,\mu}$. In one example of the predetermined default values, the default values can be $M_{PDCCH}^{max,span,\mu}$ and $C_{PDCCH}^{max,span,\mu}$ as in Rel-16 NR specifications. In another example of the predetermined default values, the default values are $M_{PDCCH}^{max,span,\mu}=0$, $C_{PDCCH}^{max,span,\mu}=0$, and the UE does not perform any PDCCH monitoring in the respective active DL BWP for a predetermined time period.

Figure 7:
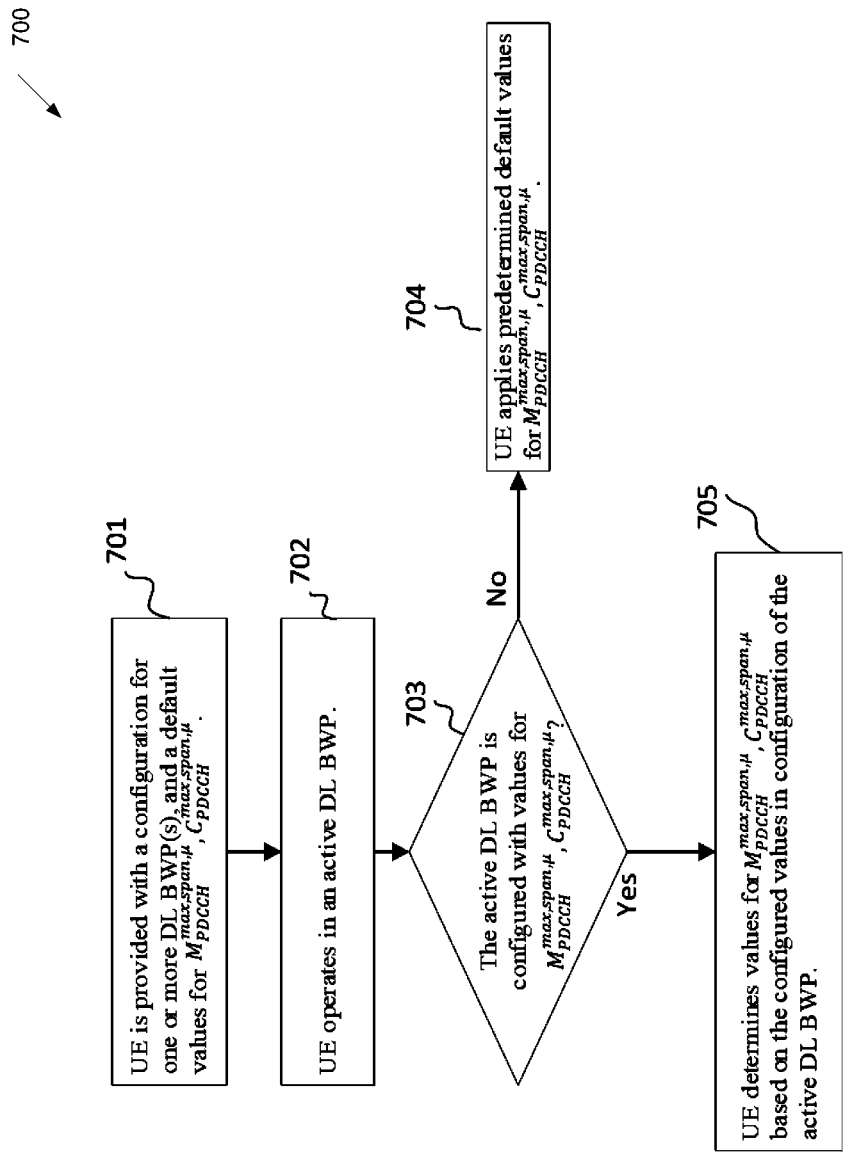
FIG. 7 illustrate another flowchart of a method for determining $M_{PDCCH}^{max,slot,\mu}$ and $C_{PDCCH}^{max,slot,\mu}$ with respect to a BW $N_{BW}^{UE}$ for a DL BWP with SCS configuration $\mu$ according to embodiments of the present disclosure.

FIG. 7 illustrate another flowchart of a method 700 for determining $M_{PDCCH}^{max,span,\mu}$ and $C_{PDCCH}^{max,span,\mu}$ with respect to a BW $N_{BW}^{UE}$ for a DL BWP with SCS configuration $\mu$ according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. For example, the method 700 may be performed by a UE such as the UE 116 in FIG. 1.

As illustrated in FIG. 7, a UE is provided with one or more DL BWPs, at step 701. The UE operates in an active DL BWP, at step 702. The UE determines whether or not the active DL BWP is configured with values for $M_{PDCCH}^{max,span,\mu}$, $C_{PDCCH}^{max,span,\mu}$, at step 703. If the active DL BWP is not configured with values for $M_{PDCCH}^{max,span,\mu}$, $C_{PDCCH}^{max,span,\mu}$, the UE applies default values for $M_{PDCCH}^{max,span,\mu}$, $C_{PDCCH}^{max,span,\mu}$ for monitoring PDCCH in the DL BWP, at step 704. The default values can be defined in the specification of system operation. Otherwise, the UE determines the values for $M_{PDCCH}^{max,span,\mu}$, $C_{PDCCH}^{max,span,\mu}$ based on the configured values for $M_{PDCCH}^{max,span,\mu}$, $C_{PDCCH}^{max,span,\mu}$ in the active DL BWP, at step 705.

In one example for determining $M_{PDCCH}^{max,span,\mu}$ and $C_{PDCCH}^{max,span,\mu}$, a UE can report one or more value(s) for $M_{PDCCH}^{max,span,\mu}$ or $C_{PDCCH}^{max,span,\mu}$ per SCS to a gNB.

In one example, the preferred values of $M_{PDCCH}^{max,span,\mu}$ or $C_{PDCCH}^{max,span,\mu}$ that the UE reports, can be part of assistance information, for example to improve UE power savings.

In another example, a UE can report values of $M_{PDCCH}^{max,span,\mu}$ or $C_{PDCCH}^{max,span,\mu}$ to a gNB as UE capability. One or more candidates of $M_{PDCCH}^{max,span,\mu}$ or $C_{PDCCH}^{max,span,\mu}$ can be defined in the specification of system operation, and a UE reports one of the candidates as UE capability. UE performs PDCCH monitoring based on the reported UE capability of $M_{PDCCH}^{max,span,\mu}$ or $C_{PDCCH}^{max,span,\mu}$ In yet another example, a UE can report values be same for all BWPs or can be separately reported for predetermined BWP sizes.

The gNB can provide the UE values of $M_{PDCCH}^{max,span,\mu}$ and $C_{PDCCH}^{max,span,\mu}$ through higher layer signaling based on a UE's report. The UE performs PDCCH monitoring based on the configured $M_{PDCCH}^{max,span,\mu}$ or $C_{PDCCH}^{max,span,\mu}$ by higher layers if any.

In one example for determining $M_{PDCCH}^{max,span,\mu}$ and $C_{PDCCH}^{max,span,\mu}$, $M_{PDCCH}^{max,span,\mu}$ and $C_{PDCCH}^{max,span,\mu}$ are determined based on UE type/capability. There are multiple UE types/capabilities coexisting in the same serving cell(s). Each of the UE types/capabilities is associated with predetermined maximum BDs and CCE limits, e.g., $M_{PDCCH}^{max,span,\mu}$ and $C_{PDCCH}^{max,span,\mu}$.

The BD and CCE limits can be either defined in the specification of system operation or provided to the UE by higher layer signaling. For the UE with reduced capability, the maximum BDs and CCE limit is smaller than normal UEs. For determining $M_{PDCCH}^{max,span,\mu}$ and $C_{PDCCH}^{max,span,\mu}$, the UE reports network (NW) the UE capability/type. In one example, a UE capability report is included in PRACH, wherein a UE transmits PRACH associated with a UE capability/type during RACH procedure, and the association between PRACH and UE capability/type is predetermined, for example defined in specification of system operation. In another example, a UE capability report is included in Msg3, wherein a UE transmits an indication of a UE capability/type in Msg3 during RACH procedure.

In one example for determining $M_{PDCCH}^{max,span,\mu}$ or $C_{PDCCH}^{max,span,\mu}$, $M_{PDCCH}^{max,span,\mu}$ or $C_{PDCCH}^{max,span,\mu}$ can be scaled relative to a reference value, $M_{PDCCH}^{max,span,\mu_0}$ or $C_{PDCCH}^{max,span,\mu_0}$ associated with a reference SCS configuration $\mu_0$, such that $M_{PDCCH}^{max,span,\mu}=F\times M_{PDCCH}^{max,span,\mu_0}$, or $C_{PDCCH}^{max,span,\mu}=F\times C_{PDCCH}^{max,span,\mu_0}$. F is a scaling factor determined based on SCS configuration, $\mu$. For example, $F=2^{(\mu_0-\mu)}$. For another example, $F=2^{(\mu-\mu_0)}$.

In one example for determining $M_{PDCCH}^{max,span,\mu}$ or $C_{PDCCH}^{max,span,\mu}$, $M_{PDCCH}^{max,span,\mu}$ or $C_{PDCCH}^{max,span,\mu}$ can be associated with a minimum PDCCH monitoring gap, X (X is defined in following embodiment). If X is determined per SCS configuration μ, the association between $M_{PDCCH}^{max,span,\mu}$ and SCS configuration μ can be omitted. If X is determined per SCS configuration μ, the association between $C_{PDCCH}^{max,span,\mu}$ and SCS configuration μ can be omitted.

In one example, $M_{PDCCH}^{max,span,\mu}$ or $C_{PDCCH}^{max,span,\mu}$ can be scaled relative to an reference value, $M_{PDCCH}^{max,span,\mu,x0}$ or $C_{PDCCH}^{max,span,\mu,x0}$, associated with a reference value of x0 for X, such that $M_{PDCCH}^{max,span,\mu}=F\times M_{PDCCH}^{max,span,\mu,x0}$ or $C_{PDCCH}^{max,span,\mu}=F\times C_{PDCCH}^{max,span,\mu,x0}$. F is a scaling factor determined based on an applicable value for X, denoted as x. For example, F=(x/x0)×a+b, where x>x0, and a, b are predetermined, e.g., 0<a<=1, b>=0. For another example, F=(x0/x)×a+b, where x<x0, and a, b are predetermined, e.g., 0<a<=1, b>=0.

In another example, $M_{PDCCH}^{max,span,\mu}$ or $C_{PDCCH}^{max,span,\mu}$ is predetermined for each applicable value for X.

In one example for determining $M_{PDCCH}^{max,span,\mu}$ or $C_{PDCCH}^{max,span,\mu}$, $M_{PDCCH}^{max,span,\mu}$ or $C_{PDCCH}^{max,span,\mu}$ can be associated with a maximum PDCCH monitoring span, Y (Y is defined in PDCCH following embodiment). If Y is determined per SCS configuration μ, the association between $M_{PDCCH}^{max,span,\mu}$ and SCS configuration μ can be omitted. If Y is determined per SCS configuration μ, the association between $C_{PDCCH}^{max,span,\mu}$ and SCS configuration μ can be omitted.

In one example, $M_{PDCCH}^{max,span,\mu}$ or $C_{PDCCH}^{max,span,\mu}$ can be scaled relative to an reference value, $M_{PDCCH}^{max,span,\mu,y0}$ or $C_{PDCCH}^{max,span,\mu,y0}$, associated with a reference value of y0 for Y, such that $M_{PDCCH}^{max,span,\mu}=F\times M_{PDCCH}^{max,span,\mu,y0}$ or $C_{PDCCH}^{max,span,\mu}=F\times C_{PDCCH}^{max,span,\mu,y0}$. F is a scaling factor determined based on an applicable value for Y, denoted as y. For example, F=(y/y0)×a+b, where a, b are predetermined, e.g., 0<a<=1, b>=0, y>y0. For another example, F=(y0/y)×a+b, where a, b are predetermined, e.g., 0<b<=1, y<y0.

In another example, $M_{PDCCH}^{max,span,\mu}$ or $C_{PDCCH}^{max,span,\mu}$ is predetermined for each applicable value for Y.

In one example for determining $M_{PDCCH}^{max,span,\mu}$ or $C_{PDCCH}^{max,span,\mu}$, a UE reports one or more applicable value(s) for $M_{PDCCH}^{max,span,\mu}$ or $C_{PDCCH}^{max,span,\mu}$ as UE assistance information based on higher layer signaling.

In one embodiment, adaptation on maximum number of monitored PDCCH candidates per span in active DL BWP based on an indication transmitted by a gNB to a UE is provided.

A span can be defined as one of: (1) a number of consecutive symbols in a slot where UE is configured to monitor PDCCH, wherein the span starts at a first symbol where a PDCCH monitoring occasion starts and ends at a last symbol where a PDCCH monitoring occasion ends; (2) a slot where UE is configured to monitor PDCCH in the slot; or (3) a number of consecutive slots where UE is configured to monitor PDCCH, wherein the span starts at a first slot where a PDCCH monitoring occasion starts and ends at a last slot where a PDCCH monitoring occasion ends.

A UE can be provided with a maximum applicable value for a number of monitored PDCCH candidates per slot for a DL BWP, denoted as $K_{PDCCH,BWP}^{max,span}$. The UE can apply a restriction for PDCCH monitoring according to the $K_{PDCCH,BWP}^{max,span}$ PDCCH candidates in applicable search space sets in the DL BWP. In one example, the applicable search space sets are all search space sets that the UE is configured in the DL BWP. In another example, the applicable search space sets are only the configured UE-specific search space sets where the UE monitors PDCCH according to a UE-specific search space and do not include search space sets when the UE monitors PDCCH according to a common search space.

In an active DL BWP, when a UE receives an indication of $K_{PDCCH,BWP}^{max,span}$ in slot n, the UE applies the indicated $K_{PDCCH,BWP}^{max,span}$, in slot n+D, where D is the application delay. To apply $K_{PDCCH,BWP}^{max,span}$, the UE does not expect to monitor a number of PDCCH candidates across all applicable search space sets larger than $K_{PDCCH,BWP}^{max,span}$. When $K_{PDCCH,BWP}^{max,span}=0$ the UE does not monitor any PDCCH candidates in applicable search space sets while the UE can be configured by higher layers or by specification to measure and perform periodic/semi-persistent transmissions/receptions, such as periodic/semi-persistent CSI-RS measurements or periodic/semi-persistent CSI reports.

For adaptation on $K_{PDCCH,BWP}^{max,span}$ in an active DL BWP based on an indication by a gNB to a UE, the UE can be provided with one or more candidate value(s) for $K_{PDCCH,BWP}^{max,span}$ by higher layer signaling for the active DL BWP. When only one candidate value is available, an indication can be using a field of 1 bit wherein a bit value of "0" can indicate $K_{PDCCH,BWP}^{max,span}$ and a bit value of "1" can indicate a predetermined default value for a maximum number of monitored PDCCH candidates per slot $K_{PDCCH,BWP}^{max,span}$.

In one example, the predetermined default value can be the $K_{PDCCH,BWP}^{max,span}$ as in NR specification. In another example, the default value can be predefined in the specification of the system operation, for example, 32, 24, 10, and 8 for SCS of 0, 1, 2, and 3, respectively. In yet another example, the default value per SCS configuration can be provided to the UE by higher layer signaling. In general, for a field with size of $N_{bits}$ bits a value v (v=0, ..., $2^{N_{bits}}-1$) can indicate the (v+1)th candidate value of $K_{PDCCH,BWP}^{max,span}$.

Figure 8:
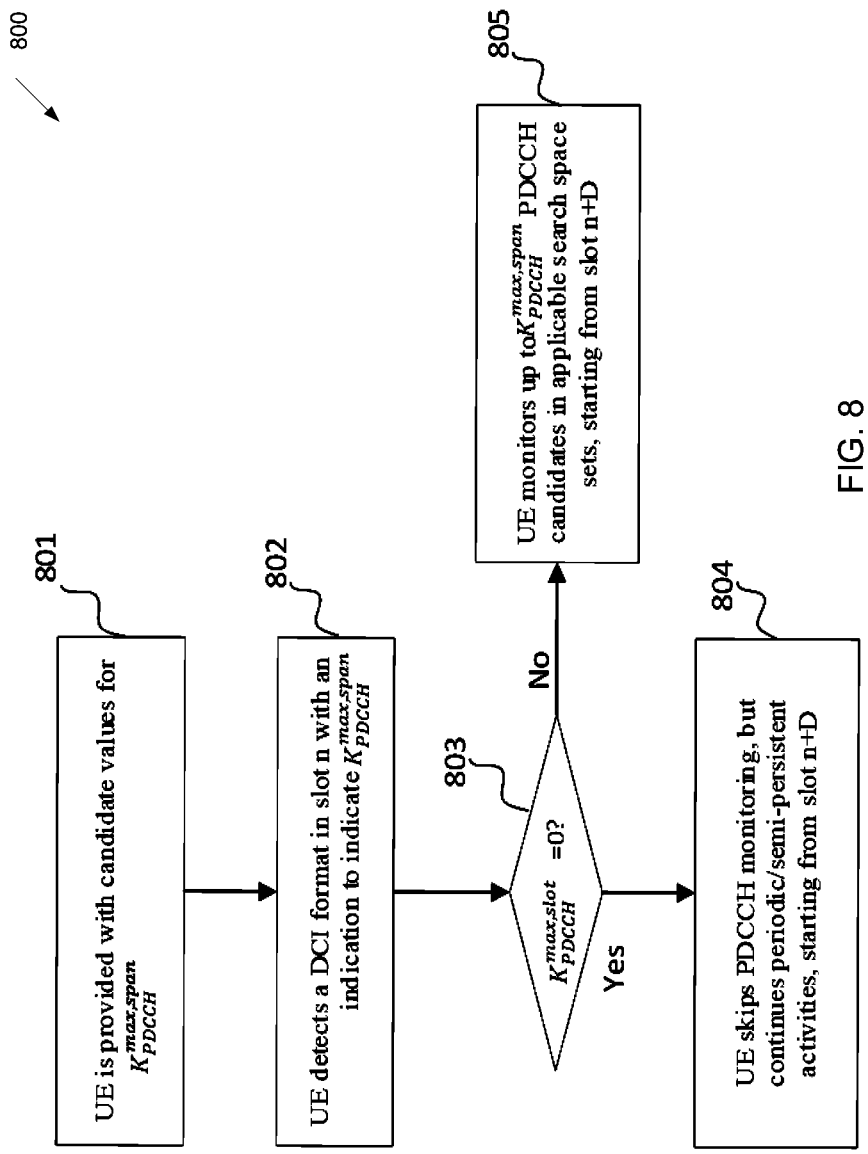
FIG. 8 illustrates a flowchart of a method for adaptation of a maximum number of monitored PDCCH candidates per slot in active DL BWP according to embodiments of the present disclosure.

FIG. 8 illustrates a flowchart of a method 800 for adaptation of a maximum number of monitored PDCCH candidates per span in active DL BWP according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. For example, the method 800 may be performed by a UE such as the UE 116 in FIG. 1.

As illustrated in FIG. 8, a UE is provided with candidate values for a maximum number of monitored PDCCH candidates per span per configured DL BWP, $K_{PDCCH,BWP}^{max,span}$, by higher layers, and an application delay, D, at step 801. The UE detects a DCI format in an active DL BWP in slot n, wherein the DCI format includes a field indicating a value for $K_{PDCCH,BWP}^{max,span}$, at step 802. The UE determines whether or not the indicated $K_{PDCCH,BWP}^{max,span}$ is zero, at step 603. When $K_{PDCCH,BWP}^{max,span}$ is zero, the UE skips PDCCH monitoring in the active DL BWP starting from slot n+D, at step 804. The UE can continue performing periodic/semi-persistent transmissions/receptions. When $K_{PDCCH,BWP}^{max,span}$ is non-zero, the UE monitors up to $K_{PDCCH,BWP}^{max,span}$ PDCCH candidates per slot, starting from slot n+D, at step 805.

A field indicating a value for $K_{PDCCH,BWP}^{max,span}$ can be an provided by a gNB to the UE through a physical layer signal/channel or by higher layer signaling such as a MAC control element. In one example, the field can be included in a DCI format provided by a PDCCH that the UE monitors according to a common search space. In one sub-example, a UE can be provided with a start position of the field by a higher layer. In another example, the field can be included in a DCI format that schedules a PDSCH reception to the UE or a PUSCH transmission by the UE. In one sub-example, the field is also used for indicating minimum scheduling offsets, i.e., minimum applicable values for K0 or K2.

When an adaptation on $K_{PDCCH,BWP}^{max,span}$ based on an indication by physical layer is supported, a UE can apply a default value of $K_{PDCCH,BWP,0}^{max,span}$ for the active DL BWP before receiving an indication from physical layer to adapt or update the value for $K_{PDCCH,BWP}^{max,span}$. The UE can determine the default value as any of the following: (1) a default value is the minimum value among all candidate values of $K_{PDCCH,BWP}^{max,span}$ in the active DL BWP; (2) a default value is the lowest indexed candidate value of $K_{PDCCH,BWP}^{max,span}$ in the active DL BWP; (3) a default value is the maximum value among all candidate values of $K_{PDCCH,BWP}^{max,span}$ the active DL BWP; and/or (4) a default value is $M_{PDCCH,BWP}^{max,span}$ as defined in Rel-16 NR specifications.

A default value is predefined in the specification of the system operation, for example, 32, 24, 10, and 8 for SCS configuration μ of 0, 1, 2, and 3, respectively. A default value per SCS configuration is be provided to the UE by higher layer signaling. A UE can report one or more value(s) for $K_{PDCCH,BWP}^{max,span}$ per SCS configuration to a serving gNB. The values can be same for all BWPs or can be separately reported for predetermined BWP sizes.

In one example, the preferred values of $K_{PDCCH}^{max,span}$ can be reported as part of assistance information for UE power savings. In another example, a UE can report a value of $K_{PDCCH}^{max,span}$ to a serving gNB as a UE capability.

In one embodiment, a determination of a minimum PDCCH monitoring gap, X, is provided. The minimum PDCCH monitoring gap is defined as a minimum time separation of X symbols or slots between the start of two consecutive PDCCH monitoring spans. A PDCCH monitoring span can be any of the following: (1) a PDCCH monitoring occasion is a number of consecutive symbols in a slot with configured PDCCH candidates to monitor from a search space set; (2) a PDCCH monitoring occasion is a number of consecutive slots with configured PDCCH candidates to monitor from a search space set; (3) a slot with configured PDCCH candidates to monitor in the slot, where the configured PDCCH candidates to monitor are from one or more search space set(s); (4) a number of consecutive symbols with configured PDCCH candidates to monitor in any of the consecutive symbols, where the configured PDCCH candidates to monitor are from one or more search space set(s); or a number of consecutive slots with configured PDCCH candidates to monitor in any of the consecutive slots, where the configured PDCCH candidates to monitor are from one or more search space set(s).

The minimum PDCCH monitoring gap can be applied to PDCCH monitoring in one or more search space sets. The one or more search space sets can be one of the following: (1) all configured search space sets; (2) a sub-group of search space sets from a group of configured search space sets; and/or (3) UE-specific search space sets.

When a UE determines an applicable value for X, denoted as x, that is larger than one slot, a PDCCH monitoring periodicity of $k_s$ slots for an applicable search space set, s, is limited by x.

In one example, $k_s$ is configured to be equal to or larger than the applicable value for X, x, such that $k_s \geq x$.

In another example, $k_s$ is configured to be multiple times of the applicable value for X, x, such that $k_s = k \times x$, k=1, 2, 3, . . . , where is a positive integer.

In yet another example, the UE can be configured with a PDCCH monitoring periodicity of $k_s$ slots for an applicable search space set, s, that is smaller than the applicable value for X, x. When the UE is configured with $k_s < x$, the UE either skips PDCCH monitoring in the search space set s, or change the PDCCH monitoring periodicity to the applicable value for X, such that $k_s = x$.

When a UE is provided with an applicable value for X, the UE monitors and receives PDCCH in a span with limitation based on X. For a span with configured PDCCH candidates to monitor, the UE determines a time separation between the start of the span and a previous/last span where UE monitored PDCCH. If the time separation is smaller than the applicable value for X, UE monitors PDCCH based one of the following examples.

In one example, the UE skips all PDCCH monitoring occasions in the span. The UE is not required to receive monitor/receive PDCCH in the span. In another method, the UE skips one or more PDCCH monitoring occasions in the span where the start between the previous/last span and the one or more PDCCH monitoring occasions is smaller than the applicable value for X. The UE is not required to monitor/receive PDCCH in the one or more PDCCH candidates in the span.

FIG. 9A illustrates an example PDCCH monitoring occasions limited by a minimum PDCCH monitoring gap. An embodiment of the PDCCH monitoring occasions 900 shown in FIG. 9A is for illustration only.

As illustrated in FIG. 9A, the minimum PDCCH monitoring gap, X is 6 slots. UE monitored PDCCH in PDCCH monitoring occasion, 901, within last PDCCH monitoring span, i−1. For span i, the time separation between the start of span i−1 and span i is 3 slots, which is smaller than 6 slots. Therefore, the UE is not required to monitor PDCCH candidates in PDCCH monitoring occasion, 902, within the span i. For span i+1, the time separation between the start of last span where UE monitored PDCCH, span i−1, and span i+1, is 6 slots, UE monitors PDCCH candidates in the configured PDCCH monitoring occasion, 903, within the span, i+1.

When a UE is not provided with an applicable value for X based on any of the examples/embodiments defined in this embodiment, the UE can assume a default value for X. In one example, default value for X is 1 slot. In another example, default value for X is 14 symbols. In yet another example, default value for X is 2 or 4 or 8 or 16 slots.

In one example for determining X, X can be determined based on a UE capability. One or more capabilities of X can be predefined in the specification, where a capability of X includes a set of one or more applicable values for X.

In one example, the capability of X can be reported by UE through higher layer signaling, for example, after RRC connection established.

In another example, the capability of X can be associated with a UE class/type. The applicable value for X associated with a UE class with reduced capabilities is larger than the applicable value for X associated with a normal UE class without reduced capabilities. For example, a UE capability report of X can be indicated by PRACH transmitted by the UE, wherein a UE transmits PRACH associated with a UE capability/type during RACH procedure, and the association between PRACH and UE capability/type is predetermined. For another example, a UE capability report of X is indicated by Msg3, wherein a UE transmits an indication of a UE capability/type in Msg3 during RACH procedure.

In one example for determining X, X can be associated with SCS configuration, μ. In one example, X can be scaled relative to a reference value, $X_0$ associated with a reference SCS configuration $\mu_0$, such that $X=F \times X_0$. F is a scaling factor determined based on SCS configuration associated with X and a SCS configuration associated with $X_0$. For example, $F=2^{(\mu-\mu_0)}$. In another example, X is predetermined per SCS configuration μ. For example, X=2 or 4 or 8 or 16 or 32 slots for μ=4 or 5 or 6. For another example, X=14 or 21 or 28 or 32 or 56 symbols for μ=4 or 5 or 6. For yet another example, X=1 slot for μ=0, 1, 2, 3, or 4.

In one example for determining X, a UE reports one or more applicable value(s) for X as UE assistance information based on higher layer signaling.

In one example for determining X, a UE is provided with an applicable value for X by higher layer signaling. In one instance, the applicable value of X is provided in a configuration parameter by higher layer signaling. In another instance, the applicable value for X is determined based on the configuration of applicable search space sets. When there are multiple candidate values for X are applicable or valid based on the configuration of applicable search space sets, the UE can determine the applicable value for X to be the maximum value from the multiple candidate values, or the smallest value from the multiple candidates, or default value from the multiple candidate values.

In one example for determining X, X can be provided to UE based on an indication in a field from a DCI format. The indication indicate an applicable value, $K_{min}^{MOGap}$ for X. When a UE is provided with $K_{min}^{MOGap}$, the UE expects the time gap between two consecutive PDCCH monitoring occasions is equals to or larger than $K_{min}^{MOGap}$. A PDCCH monitoring occasions can be a number of consecutive slots or symbols where the UE is configured to monitor PDCCH. In one example, $K_{min}^{MOGap}$ is applied per applicable search space set, wherein the two consecutive PDCCH monitoring durations can be PDCCH monitoring occasions from the same search space set. In another example, $K_{min}^{MOGap}$ is applied among all applicable search space sets, wherein the two consecutive PDCCH monitoring occasions can be PDCCH monitoring occasions from different applicable search space sets.

When a UE is provided with $K_{min}^{MOGap}$ from a gNB for an active DL BWP, the UE monitors at most one PDCCH monitoring occasion out from all configured applicable PDCCH monitoring occasions for a time period of $K_{min}^{MOGap}$ consecutive slot(s). In one example, the UE monitors the kth configured PDCCH monitoring occasion among all applicable search spaces, every $K_{min}^{MOGap}$ slots. In another example, the UE monitors the kth configured PDCCH monitoring occasion every $K_{min}^{MOGap}$ slots per applicable search space set. In one example of determination of k, k can be predetermined, for example, k=1. In another example of determination of k, k can be the first effective PDCCH monitoring occasion after processing the adaptation indication.

In an active DL BWP, when a UE receives an indication of $K_{min}^{MOGap}$ in slot n, the UE applies the indicated $K_{min}^{MOGap}$ in slot n+D, where D is an application delay. The UE applies $K_{min}^{MOGap}$ for PDCCH monitoring in the active DL BWP, by monitoring an Nth (N=1, . . . $K_{min}^{MOGap}$) applicable PDCCH monitoring occasion, if configured, for every $K_{min}^{MOGap}$ consecutive slot(s) starting from slot n+D. For a time period of $K_{min}^{MOGap}$ slots, denoted as [n+D+$K_{min}^{MOGap} \cdot K$, n+D+$K_{min}^{MOGap} \cdot (K+1)$], where K=0, 1, 2, . . . , the UE only monitors the Nth applicable PDCCH monitoring occasion, if configured, within the time period, and skips other applicable PDCCH monitoring occasions within the time period.

For determination of N, a UE can determine N through any of the following examples. In one example, N is predefined in the specification of the system operation, for example N=1. In one example, N is provided to the UE through higher layer signaling. In one example, N is determined based on a UE ID, denoted as UE_ID. For example, N=mod (UE_ID, $K_{min}^{MOGap}$)+1. For example, the UE ID can be a cell-RNTI (C-RNTI) used to scramble a CRC of a DCI format scheduling a PDSCH reception by the UE or a PUSCH transmission by the UE. For example, the UE ID can be the ID UE used for paging, such that UE_ID=5G-S-TMSI mod 1024.

FIG. 9B illustrates an example PDCCH monitoring occasions 950 from two configured search space sets according to embodiments of the present disclosure. An embodiment of the PDCCH monitoring occasions 950 shown in FIG. 9B is for illustration only.

As illustrated in FIG. 9B, a UE is configured with two search space sets, wherein search space set 1 has PDCCH monitoring periodicity of 3 slots and search space set 2 has PDCCH monitoring periodicity of 1. If the UE is provided with $K_{min}^{MOGap}=0$, the UE monitors all PDCCH monitoring occasions, 951-957 for all configured search space sets. If the UE applies $K_{min}^{MOGap}=2$ starting form slot n, the UE may monitor the first PDCCH monitoring occasion for every 2 slots, and skip other PDCCH monitoring occasions, such that the UE monitors 951, 954, 957, and skips 952, 953, 955, and 956.

For determination of application delay D for applying an indication on $K_{min}^{MOGap}$, a UE can determine D through any of the following examples. In one example, D is predefined in the specification of the system operation, for example D=1 slot. In one example, D is provided to the UE through higher layer signaling. In one example, when the indication is provided by a DCI format scheduling a PDSCH reception or a PUSCH transmissions, D can be determined in a same manner as an application delay for a minimum scheduling offset restriction.

D can be in a unit of one symbol or one slot. In one example, a UE applies the minimum time separation between two consecutive PDCCH monitoring occasions indicated by a DCI format D symbols after the last symbol of the PDCCH providing the DCI format. In another example, a UE applies the minimum time separation between two consecutive PDCCH monitoring occasions indicated by a DCI format D slots after the last slot of the PDCCH providing the DCI format.

For an adaptation of $K_{min}^{MOGap}$, a UE can be provided, by higher layers one, or more candidate values for $K_{min}^{MOGap}$ per configured DL BWP. A field with size of $N_{bits}$ bits in a DCI format can be used to indicate one of $2^{N_{bits}}-1$ candidate values, such that a value v, (v=0, . . . , $2^{N_{bits}}-1$ of the field can indicate the (v+1)th candidate value for $K_{min}^{MOGap}$. When only one candidate value is available, an indication of 1 bit in a DCI format can be used to indicate the adaptation on $K_{min}^{MOGap}$, wherein the indication with value "0" can indicate the candidate value, and the indication with value "1" can indicate no restriction on minimum PDCCH monitoring occasion gap, such that the UE monitors all configured PDCCH monitoring occasions. In one sub-example, the indication can be same as the one used for indicating minimum applicable values for scheduling offset, K0/K2 as defined in NR standard specification.

Figure 10A:
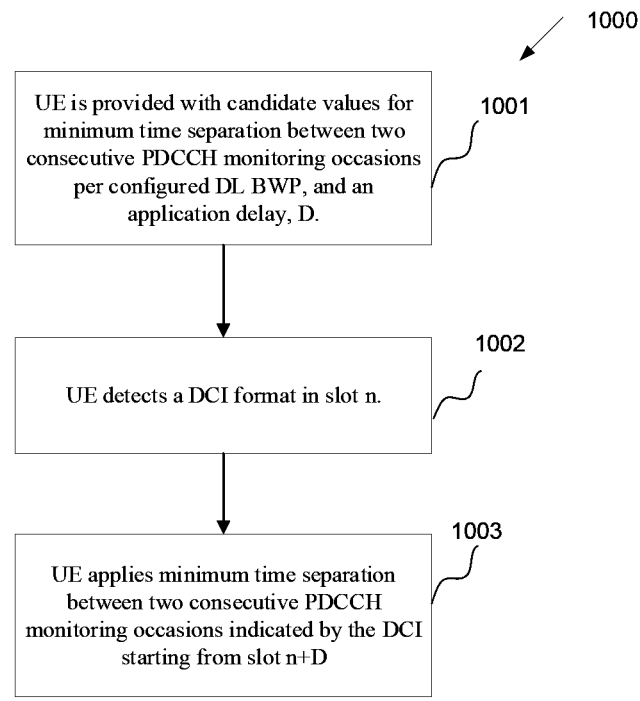
FIG. 10A illustrates a flowchart of a method of UE for adaptation on minimum time separation between two consecutive PDCCH monitoring occasions according to embodiments of the present disclosure.

FIG. 10A illustrates a flowchart of a method 1000 of UE for adaptation on minimum time separation between two consecutive PDCCH monitoring occasions according to embodiments of the present disclosure. An embodiment of the method 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. For example, the method 1000 may be performed by a UE such as the UE 116 in FIG. 1.

As illustrated in FIG. 10A, a UE is provided by higher layers candidate values for minimum time separation between consecutive PDCCH monitoring occasions, $K_{min}^{MOGap}$, per configured DL BWP. An application delay for an indicated value of $K_{min}^{MOGap}$ is D, step 1001. The UE detects a DCI format in an active DL BWP in slot n that includes an indication for a value of $K_{min}^{MOGap}$, at step 1002. The UE applies the indicated $K_{min}^{MOGap}$ for determining PDCCH monitoring occasions in the active DL BWP and the UE monitors only the first PDCCH monitoring occasion, if configured for a corresponding search space set, for every $K_{min}^{MOGap}$ consecutive slots, starting form slot n+D, at step 1003.

A UE can report one or more value(s) for $K_{min}^{MOGap}$ per SCS configuration to a serving gNB. In one example, the UE can report preferred values of K as part of assistance information for UE power savings. In another example, the UE can report a value of $K_{min}^{MOGap}$ to a serving gNB as a UE capability. A UE capability parameter, for example pdcch-RelaxedSpanGap, can indicate a minimum time separation between consecutive PDCCH transmissions that the UE supports for relaxed PDCCH processing. pdcch-RelaxedSpanGap can include one or more value sets, (X, Y) per SCS configuration, where X is a minimum time separation between consecutive PDCCH transmissions in the unit of one slot, and Y is a span for one PDCCH monitoring occasion for a corresponding search space set in the unit of one OFDM symbol or one slot. One or more value sets can be predefined, and UE can report one or more value sets in pdcch-RelaxedSpanGap to the serving gNB. For example, a possible value set can be (2, 7) and indicate a minimum time separation between consecutive PDCCH transmissions of 2 slots for span up to 7 OFDM symbols.

When an adaptation on $K_{min}^{MOGap}$ based on an indication by physical layer signaling, the UE applies a default value of $K_{min}^{MOGap}$ for the active DL BWP before receiving an indication from the physical layer for a value of $K_{min}^{MOGap}$ in the active DL BWP or active UL BWP. The UE can determine the default value as any of the following: (1) a default value is the minimum value among all candidate values configured for $K_{min}^{MOGap}$ in the active DL BWP; (2) a default value is the lowest indexed candidate value for $K_{min}^{MOGap}$ configured in the active DL BWP; (3) a default value is the maximum value among all candidate values configured for $K_{min}^{MOGap}$ in the active DL BWP; and/or (4) a default value is zero when only one candidate value for $K_{min}^{MOGap}$ is configured for the active DL BWP. In this case, there is no restriction applied to configured PDCCH monitoring occasions.

In one embodiment, a determination of a maximum PDCCH monitoring span, Y, is provided.

A PDCCH monitoring span can be defined as one of: (1) a number of consecutive symbols in a slot where a UE is configured to monitor PDCCH, wherein the PDCCH monitoring span starts at a first symbol where a PDCCH monitoring occasion starts and ends at a last symbol where a PDCCH monitoring occasion ends; (2) a slot where a UE is configured to monitor PDCCH in the slot; or (3) a number of consecutive slots where a UE is configured to monitor PDCCH, wherein the PDCCH monitoring span starts at a first slot where a PDCCH monitoring occasion starts and ends at a last slot where a PDCCH monitoring occasion ends.

The maximum PDCCH monitoring span can be applied to PDCCH monitoring in one or more search space sets. The one or more search space sets can be one of the following: (1) all configured search space sets; (2) a sub-group of search space sets from a group of configured search space sets; or (3) UE-specific search space sets.

When a UE determines an applicable value for Y, i.e., y, that is larger than one slot, the PDCCH monitoring duration of $T_s$ slots for an applicable search space set, s is limited by y.

In one example, $T_s$ is configured to be equal to or smaller than the applicable value for X, x, such that $T_s \leq y$. In another example, a UE can be configured with a PDCCH monitoring duration of $T_s$ slots for an applicable search space set, s, that is larger than the applicable value for Y, y. When a PDCCH monitoring occasion with configured PDCCH candidates from the search space set is in a slot that is not within a PDCCH monitoring span up to Y slots, the UE skips the PDCCH monitoring occasion, and doesn't receive the PDCCH candidates in the PDCCH monitoring occasion.

When a UE is provided with an applicable value for Y, the UE monitors and receives PDCCH in a PDCCH monitoring span up to the applicable value. For a PDCCH monitoring occasion with configured PDCCH candidates from a search space set that is not within a PDCCH monitoring span up to the applicable value, the UE skips the PDCCH monitoring occasion, and the UE is not required to monitor the PDCCH candidates in the PDCCH monitoring occasion.

Figure 10B:
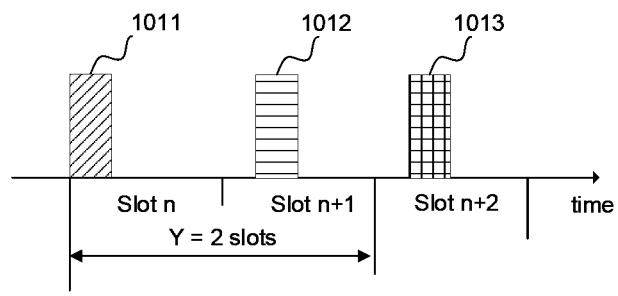
FIG. 10B illustrates an example PDCCH monitoring span of 3 slots and Y=2 slots according to embodiments of the present disclosure.

FIG. 10B illustrates an example PDCCH monitoring span 1050 of 3 slots and Y=2 slots according to embodiments of the present disclosure. An embodiment of the PDCCH monitoring span 1050 shown in FIG. 10B is for illustration only.

As illustrated in FIG. 10B, there is a PDCCH monitoring span with configured PDCCH monitoring occasions, 1011, 1012, and 1013. For PDCCH monitoring occasions 1011 and 1012, the monitoring occasions are within the PDCCH monitoring span up to Y=2 slots, so UE monitors PDCCH candidates within the PDCCH monitoring occasion, 1011 and 1012. But for PDCCH monitoring occasion 1013, it is outside of the span up to 2 slots, thus UE skips PDCCH monitoring in the PDCCH monitoring occasion, 1013.

When a UE is not provided with an applicable value for Y based on any of the examples/embodiments defined in this embodiment, the UE can assume a default value for Y. In one example, the default value for Y is 1 slot. In another example, the default value for Y is 2 symbols. In yet another example, the default value for Y is 3 symbols.

In one example for determining Y, Y can be determined based on a UE capability. One or more capabilities of Y can be predefined in the specification, where a capability of Y includes a set of one or more applicable values for Y.

In one example, the capability of Y can be reported by UE through higher layer signaling, for example, after RRC connection established.

In another example, the capability of Y can be associated with a UE class/type. The applicable value for Y associated with a UE class with reduced capabilities is smaller than the applicable value for Y associated with a normal UE class without reduced capabilities. For example, a UE capability report of Y can be indicated by PRACH transmitted by the UE, wherein a UE transmits PRACH associated with a UE capability/type during RACH procedure, and the association between PRACH and UE capability/type is predetermined. For another example, a UE capability report of Y is indicated by Msg3, wherein a UE transmits an indication of a UE capability/type in Msg3 during RACH procedure.

In one example for determining Y, Y can be associated with SCS configuration, $\mu$. In one example, Y can be scaled relative to a reference value, $Y_0$ associated with a reference SCS configuration $\mu_0$, such that $Y=F\times Y_0$. F2 is a scaling factor determined based on SCS configuration associated with Y and a SCS configuration associated with $Y_0$. For example, $F=2^{(\mu-\mu_0)}$. In another example, Y is predetermined per SCS configuration $\mu$. For example, Y=1 or 2 or 4 or 8 slots for $\mu$=4 or 5 or 6. For another example, Y=2 or 3 or 7 or 14 symbols for $\mu$=4 or 5 or 6.

In one example for determining Y, a UE reports one or more applicable value(s) for Y as UE assistance information based on higher layer signaling.

In one example for determining Y, a UE is provided with an applicable value for Y by higher layer signaling. In one instance, the applicable value of Y is provided in a configuration parameter by higher layer signaling. In another instance, the applicable value for Y is determined based on the configuration of applicable search space sets. When there are multiple candidate values for Y are applicable or valid based on the configuration of applicable search space sets, the UE can determine the applicable value for Y to be the maximum value from the multiple candidate values, or the smallest value from the multiple candidates, or default value from the multiple candidate values.

In one example for determining Y, a UE is provided with an applicable value for Y based on an indication included in a field from a DCI format. The indication can indicate applicable value for Y and X jointly. For example, multiple combinations of (X, Y) can be predetermined either in the specification of the system or based on predefined UE capabilities. The indication indicates one of the multiple combinations as the applicable values for X and Y.

When a UE is provided with an applicable value for Y, the UE determines a maximum number of PDCCH candidates, M, and non-overlapped CCEs, C, the UE can monitor per PDCCH monitoring span up to the applicable value for Y. The UE does not expect to monitor per PDCCH monitoring span a number of PDCCH candidates or a number of non-overlapped CCEs that is larger than the maximum number. For all search space sets within a PDCCH monitoring span up to the applicable value for Y, denote by $S_{CSS}$ a set of CSS sets with cardinality of $I_{CSS}$ and by $S_{USS}$ a set of USS sets with cardinality of $J_{USS}$. The location of USS sets $S_j$, $0 \leq j < J_{USS}$, in $S_{USS}$ is according to an ascending order of the search space set index. Denote by $M_{S_{CSS}(i)}^{(L)}$, $0 \leq i < I_{CSS}$, the number of counted PDCCH candidates for monitoring for CSS set $S_{CSS}$ (i) and by $M_{S_{USS}(j)}^{(L)}$, $0 \leq j < J_{USS}$, the number of counted PDCCH candidates for monitoring for USS set $S_{USS}(j)$.

For the CSS sets, a UE monitors $$M_{PDCCH}^{CSS} = \sum_{i=0}^{I_{CSS}-1} \sum_L M_{S_{CSS}(i)}^{(L)} PDCCH$$

candidates requiring a total of $C_{PDCCH}^{CSS}$ non-overlapping CCEs in a PDCCH monitoring span. The UE allocates PDCCH candidates for monitoring to USS sets in a PDCCH monitoring span according to the max, max, pseudocode specified in [3], where $M_{PDCCH}^{max,slot,\mu}$ and $C_{PDCCH}^{max,slot,\mu}$ are replaced by M, and C.

In one embodiment, search space set switching triggered by a DCI format based on a USS is provided.

A UE can be provided with two or more search space set groups for a BWP per serving cell or a serving cell group. In one example, the applicable serving cell is PCell or SpCell. In another example, the applicable serving cells are SCells. In one sub-example, the serving cell group can be same as SCell group for dormancy BWP switching that is indicated by higher layer parameter, Scell-groups-for-dormancy-outside-active-time. For determining associated search space sets for a search space set group, the UE can either be provided with the search space set group index for each configured search space set or be provided with the index of search space sets for each configured search space set group.

A UE can monitor PDCCH in search space set(s) associated with a default search space set group before receiving any DCI format triggering search space set switching. In one method for determining default search space set group, the default search space set group can be one of the configured search space set groups, for example the configured search space set group with index 0. In another example for determining default search space set group, the default search space set group is provided to the UE by higher layers. In yet another example for determining default search space set group, the default search space set group is determined based on UE's report of the UE's preferred default search space set group.

In one example, for a search space set switching triggered by a DCI format based on USS, the DCI format schedules a PDSCH reception or a PUSCH transmission in a target BWP. The UE-specific DCI format includes a search space set switching indicator to trigger search space set switching for the target BWP.

In one example, the search space set switching indicator is an explicit field in the DCI format. If there is no serving cell or serving cell group configured for search space set switching, the size of the search space set switching indicator is 0; otherwise the size of the search space set switching indicator is a bitmap with N>=1 bits, where each bit corresponds to one of serving cell(s) or serving cell group(s) configured by higher layers with a most significant bit (MSB) to a least significant bit (LSB) of the N bitmap corresponding to the first to last configured serving cell or serving cell group. The value of a bit from the bitmap indicates the index of search space set group for PDCCH monitoring in the active DL BWP of the corresponding serving cell or serving cell group.

In another example, a UE is provided with minimum applicable scheduling offset indicator in the DCI format, and the minimum applicable scheduling offset indicator is also used as the search space set switching indicator. The minimum applicable scheduling offset indicator triggers adaptation on minimum scheduling offset for a target BWP i, and UE can interpret the value of the minimum applicable scheduling offset as index of the indicated search space set group for PDCCH monitoring in BWP i.

In yet another example, a UE is provided with a S Cell dormancy indicator with bitmap size of M and a search space set switching indicator with N bits, where N<=M. The search space set switching indicator is used to trigger search space set switching for SCell(s) which are indicated with non-dormancy BWP by the SCell dormancy indicator. In one sub-example, each of the N bits corresponds to a SCell group with non-dormancy BWP indicated by the SCell dormancy indicator, and the MSB to LSB of the search space set switching indicator corresponding to the first to the last SCell group with non-dormancy BWP indicated by the SCell dormancy indicator.

The value of a bit from the N bits indicates the index of search space set group for PDCCH monitoring in the non-dormancy BWP of the corresponding SCell group. When the number of SCell group with non-dormancy BWP indicated by the SCell dormancy indicator is larger than N, UE applies default search space set group to the serving cells associated with a SCell group indicated with non-dormancy BWP if there is no bit from the search space set switching indicator corresponding to the SCell group. In another sub-example, N=1. The search space set switching indicator corresponds to all serving cell(s) associated with SCell group(s) that are indicated with non-dormancy BWP by the SCell dormancy indicator. The value of search space set switching indicator indicates the index of search space set group for PDCCH monitoring in the non-dormancy BWP of the corresponding SCell group(s).

Figure 11:
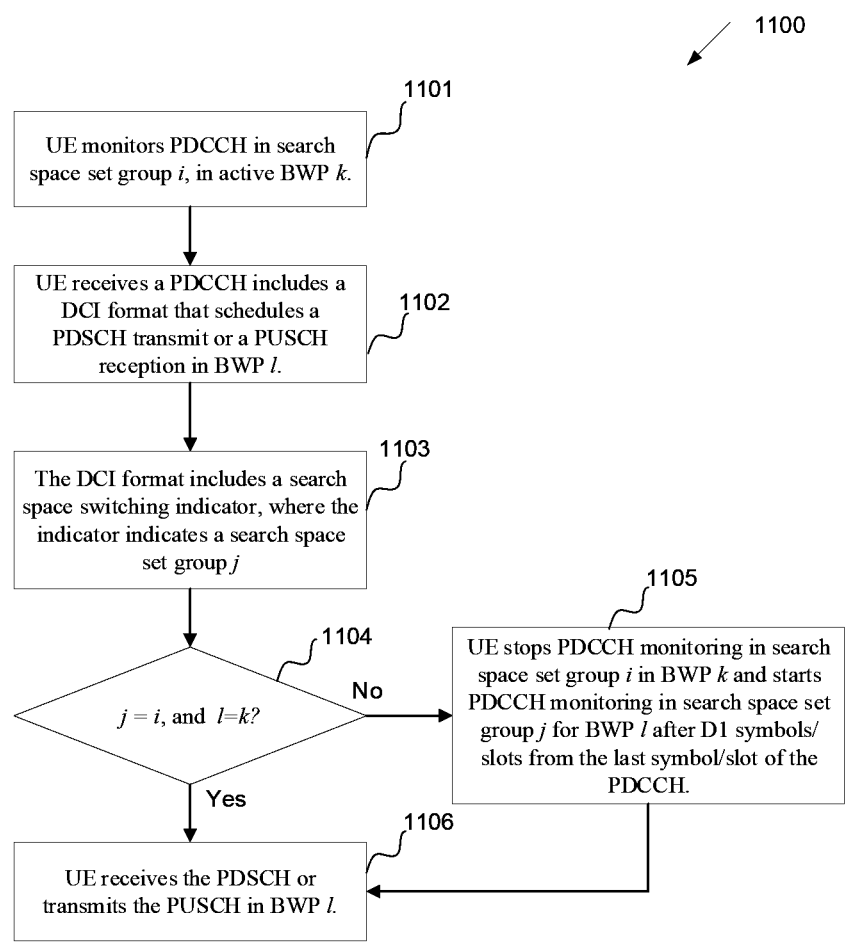
FIG. 11 illustrates a flowchart of a method of UE for search space set switching triggered by a DCI format based on USS according to embodiments of the present disclosure.

FIG. 11 illustrates a flowchart of a method 1100 of UE for search space set switching triggered by a DCI format based on USS according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. For example, the method 1100 may be performed by a UE such as the UE 116 in FIG. 1.

As illustrated in FIG. 11, for a UE operating within an active time of DRX, the UE monitors PDCCH in search space sets associated with a search space set group, i in an active BWP k, at step 1101. The UE receives a PDCCH in USS includes a DCI format that schedules a PDSCH reception or a PUSCH transmission in target BWP l, at step 1102. The DCI format includes a search space set switching indicator, and the search space set switching indicator indicates a search space set group, j, at step 1103. If UE determines, at step 1104, i=j, and k=l, the UE continues monitoring PDCCH in the search space sets associated with search space set i in BWP k; otherwise, the UE stops PDCCH monitoring in search space sets associated with search space set group i in BWP k and starts PDCCH monitoring in search space sets associated with search space set group j in BWP l after D1 slots/symbols from the last slot/symbol of the PDCCH providing the DCI format, at step 1105. The UE receives the scheduled PDSCH or transmits the scheduled PUSCH in target BWP l, at step 1106.

In one example for a search space set switching triggered by a DCI format based on USS, the DCI format can be a DCI format with CRC scrambled by a C-RNTI or a modulation coding scheme cell-RNTI (MCS-C-RNTI), and without scheduling a PDSCH reception or a PUSCH transmission. UE can determine that DCI format doesn't schedule a PDSCH reception or a PUSCH transmission by any of the following methods. In one example, resourceAllocation=resourceAllocationType0 and all bits of the frequency domain resource assignment field in the DCI format are equal to 0. In another example, resourceAllocation=resourceAllocationType1 and all bits of the frequency domain resource assignment field in the DCI format are equal to 1. In yet another example, resourceAllocation=dynamicSwitch and all bits of the frequency domain resource assignment field in the DCI format are equal to 0 or 1.

The UE interprets the sequence of any of the following fields for transport block 1: (1) a modulation and coding scheme; (2) a new data indicator; (3) a redundancy version; (4) a HARQ process number; (5) an antenna port(s); and/or (6) DMRS sequence initialization.

As providing a bitmap to each configured applicable serving cell or serving cell group for search space set switching, in an ascending order of the serving cell or serving cell group index, where a value for a bit of the bitmap indicates a search space set group index for PDCCH monitoring in the active DL BWP of corresponding serving cell or a serving cell group.

When the UE-specific DCI format is associated with scheduling PDSCH reception, the UE is expected to provide HARQ-acknowledgement (HARQ-ACK) information in response to a detection of the DCI format after D2 symbols from the last symbol of a PDCCH providing the DCI format. D2 can be determined based on µ, where µ is the smallest SCS configuration between the SCS configuration of the PDCCH providing the DCI format and the SCS configuration of a PUCCH with the HARQ-ACK information in response to the detection of the DCI format. For example, N=5 for µ=0, N=5.5 for µ=1, N=11 for µ=2; For another example, N=10 for µ=0, N=12 for µ=1, N=22 for µ=2, and N=25 for µ=3.

Figure 12:
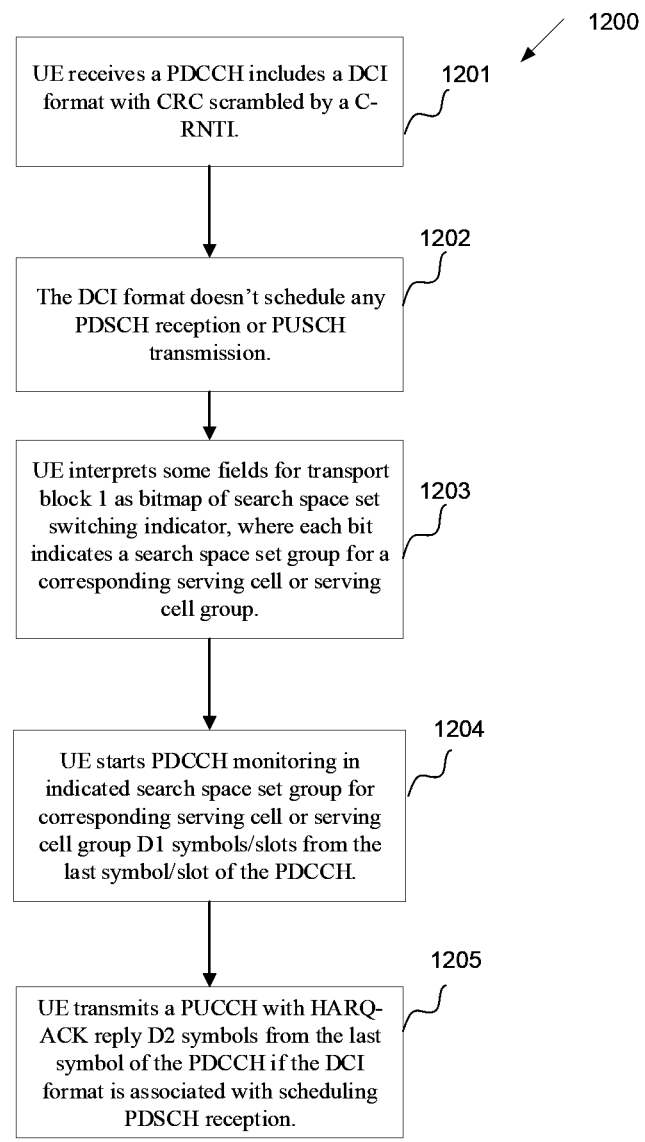
FIG. 12 illustrates another flowchart of a method of UE for search space set switching triggered by a DCI format based on USS according to embodiments of the present disclosure.

FIG. 12 illustrates another flowchart of a method 1200 of UE for search space set switching triggered by a DCI format based on USS according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. For example, the method 1200 may be performed by a UE such as the UE 116 in FIG. 1.

As illustrated in FIG. 12, for a UE in active time, the UE receives a PDCCH receives a PDCCH includes a DCI format with CRC scrambled by a C-RNTI or an MCS-C-RNTI, 1001. The UE determines that the DCI format does not schedule a PUSCH transmission or a PDSCH reception, at step 1202. The UE interprets fields for transport block 1, including modulation and coding scheme, new data indicator, and redundancy version, as bitmap of search space set switching indicator, where each bit indicates a search space set group for a corresponding serving cell or serving cell group, at step 1203. The UE starts PDCCH monitoring in indicated search space set group for corresponding serving cell or serving cell group D1 symbols/slots from the last symbol/slot of the PDCCH, at step 1204. The UE transmits a PUCCH with HARQ-ACK reply D2 symbols from the last symbol of the PDCCH if the DCI format is associated with scheduling PDSCH reception, at step 1205.

For determining the valid duration of indicated search space set group, a UE can assume any of the following methods. In one example, the indicated search space set group is valid till the UE applies a new search space set switching indicator. In another example, a valid duration can be predetermined in the specification of the system operation. The UE starts a timer with initial value of the valid duration when the UE applies a search space set switching indicator, and the UE switches to default search space set group for PDCCH monitoring when the timer expires. In yet another example, a valid duration can be provided to the UE by higher layers. The UE starts a timer with initial value of the configured valid duration when the UE applies a search space set switching indicator, and the UE switches to default search space set group for PDCCH monitoring when the timer expires. In yet another example, the valid duration for a search space set group can be indicated by the DCI format that indicates the search space set group. The UE can be provided with both a search space set switching indicator and a valid duration indicator in a DCI format for triggering search space set switching. The UE starts a timer with initial value of the indicated valid duration when the UE applies a search space set switching indicator, and the UE switches to default search space set group for PDCCH monitoring when the timer expires.

For determining application delay, D1, a UE can assume any of the following methods. In one example, the application delay D1 is same as the application delay for adaptation on minimum scheduling offset. In another example, the application delay D1 is predetermined in the specification of the system operation. In yet another example, the application delay D1 is provided to the UE by higher layers. In yet another example, the application delay D1 is reported from UE to NW as UE capability. In yet another example, the application delay D1 is same as BWP switching delay.

A UE applies the search space set group indicated by a DCI format D1 symbols after the last symbol of the PDCCH providing the DCI format when D1 is in unit of one symbol. UE applies the search space set group indicated by a DCI format D1 slots after the last slot of the PDCCH providing the DCI format when D1 is in the unit of one slot.

In another aspect, a UE can report preferred search space set group for PDCCH monitoring as power saving assistance information. In one example, the UE can report a preferred search space set group for active DL BWP corresponds to all active serving cells. In another example, the UE can report a list of preferred search space set groups, where each preferred search space set group corresponds to a serving cell or a serving cell group.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive a configuration for one or more search space sets, wherein the one or more search space sets provide parameters for one or more candidate physical downlink control channel (PDCCH) receptions; and
a processor operably connected to the transceiver, the processor configured to determine a first number of candidate PDCCH receptions for a first number of more than one consecutive slots, wherein:
a candidate PDCCH reception is over a number of control channel elements (CCEs),
the first number of candidate PDCCH receptions over a corresponding number of CCEs does not exceed a capability corresponding to the first number of more than one consecutive slots for a maximum number of candidate PDCCH receptions over a corresponding maximum number of non-overlapped CCEs, and
the transceiver is further configured to receive the first number of candidate PDCCH receptions.

2. The UE of claim 1, wherein:
the transceiver is further configured to transmit a set of values,
the first number of candidate PDCCH receptions are with a first sub-carrier spacing (SCS) from a set of SCS,
a value from the set of values indicates a number of more than one consecutive slots for a SCS from the set of SCS, and
the first number of more than one consecutive slots corresponds to a first value from the set of values for the first SCS.

3. The UE of claim 1, wherein:
the first number of candidate PDCCH receptions are within a second number of one or more consecutive slots, and
the second number of one or more consecutive slots is smaller than the first number of more than one consecutive slots.

4. The UE of claim 3, wherein:
the transceiver is further configured to transmit a set of values,
the first number of candidate PDCCH receptions are with a first sub-carrier spacing (SCS) from a set of SCS,
a value from the set of values indicates a number of more than one consecutive slots and a number of one or more consecutive slots for a SCS from the set of SCS, and
the first number of more than one consecutive slots and the second number of one or more consecutive slots correspond to a first value from the set of values for the first SCS.

5. The UE of claim 3, wherein:
the processor is further configured to determine a first number of search space sets from the one or more search space sets,
the first number of candidate PDCCH receptions are for the first number of search space sets,
each of the one or more search space sets has an index, and
each search space set from the first number of search space sets has a smaller index than any search space set from the one or more search space sets that is not from the first number of search space sets.

6. The UE of claim 1, wherein:
the first number of candidate PDCCH receptions are with a first sub-carrier spacing (SCS),
the capability is from a predetermined set of capabilities, and
the capability additionally corresponds to the first SCS.

7. The UE of claim 1, wherein:
the transceiver is further configured to:
transmit an indication for a time offset, and
receive a configuration for at least two search space set groups;
a first candidate PDCCH reception from the first number of candidate PDCCH receptions provides a downlink control information (DCI) format;

the DCI format includes a field with a value indicating a search space set group from the at least two search space set groups; and the transceiver is further configured to receive a second number of candidate PDCCHs according to the search space set group after the time offset from a last symbol of the first candidate PDCCH reception.

8. A base station (BS) comprising:
a transceiver configured to transmit a configuration for one or more search space sets, wherein the one or more search space sets provide parameters for one or more candidate physical downlink control channel (PDCCH) transmissions; and
a processor operably connected to the transceiver, the processor configured to determine a first number of candidate PDCCH transmissions for a first number of more than one consecutive slots, wherein:
    a candidate PDCCH transmission is over a number of control channel elements (CCEs),
    the first number of candidate PDCCH transmissions over a corresponding number of CCEs does not exceed a capability corresponding to the first number of more than one consecutive slots for a maximum number of candidate PDCCH transmissions over a corresponding maximum number of non-overlapped CCEs, and
    the transceiver is further configured to transmit the first number of candidate PDCCH transmission.

9. The BS of claim 8, wherein:
the transceiver is further configured to receive a set of values,
the first number of candidate PDCCH transmissions are with a first sub-carrier spacing (SCS) from a set of SCS,
a value from the set of values indicates a number of more than one consecutive slots for a SCS from the set of SCS, and
the first number of more than one consecutive slots corresponds to a first value from the set of values for the first SCS.

10. The BS of claim 8, wherein:
the first number of candidate PDCCH transmissions are within a second number of one or more consecutive slots, and
the second number of one or more consecutive slots is smaller than the first number of more than one consecutive slots.

11. The BS of claim 10, wherein:
the transceiver is further configured to receive a set of values,
the first number of candidate PDCCH transmissions are with a first sub-carrier spacing (SCS) from a set of SCS,
a value from the set of values indicates a number of more than one consecutive slots and a number of one or more consecutive slots for a SCS from the set of SCS, and
the first number of more than one consecutive slots and the second number of one or more consecutive slots correspond to a first value from the set of values for the first SCS.

12. The BS of claim 10, wherein:
the processor is further configured to determine a first number of search space sets from the one or more search space sets,
the first number of candidate PDCCH transmissions are for the first number of search space sets,
each of the one or more search space sets has an index, and each search space set from the first number of search space sets has a smaller index than any search space set from the one or more search space sets that is not from the first number of search space sets.

13. The BS of claim 8, wherein:
the first number of candidate PDCCH transmissions are with a first sub-carrier spacing (SCS),
the capability is from a predetermined set of capabilities, and
the capability additionally corresponds to the first SCS.

14. The BS of claim 8, wherein:
the transceiver is further configured to:
    receive an indication for a time offset, and
    transmit a configuration for at least two search space set groups;
a first candidate PDCCH transmission from the first number of candidate PDCCH transmissions provides a downlink control information (DCI) format;
the DCI format includes a field with a value indicating a search space set group from the at least two search space set groups; and
the transceiver is further configured to transmit a second number of candidate PDCCHs according to the search space set group after the time offset from a last symbol of the first candidate PDCCH transmission.

15. A method comprising:
receiving a configuration for one or more search space sets, wherein the one or more search space sets provide parameters for one or more candidate physical downlink control channel (PDCCH) receptions;
determining a first number of candidate PDCCH receptions for a first number of more than one consecutive slots, wherein:
    a candidate PDCCH reception is over a number of control channel elements (CCEs), and
    the first number of candidate PDCCH receptions over a corresponding number of CCEs does not exceed a capability corresponding to the first number of more than one consecutive slots for a maximum number of candidate PDCCH receptions over a corresponding maximum number of non-overlapped CCEs; and
receiving the first number of candidate PDCCH receptions.

16. The method of claim 15, further comprising:
transmitting a set of values; and
determining the first number of candidate PDCCH receptions are with a first sub-carrier spacing (SCS) from a set of SCS, wherein:
    a value from the set of values indicates a number of more than one consecutive slots for a SCS from the set of SCS, and
    the first number of more than one consecutive slots corresponds to a first value from the set of values for the first SCS.

17. The method of claim 15, further comprising:
determining the first number of candidate PDCCH receptions are within a second number of one or more consecutive slots, wherein:
    the second number of one or more consecutive slots is smaller than the first number of more than one consecutive slots,
    the first number of candidate PDCCH receptions are with a first sub-carrier spacing (SCS),
    the capability is from a predetermined set of capabilities, and
    the capability additionally corresponds to the first SCS.

18. The method of claim 17, further comprising:
transmitting a set of values; and
determining the first number of candidate PDCCH receptions are with the first SCS from a set of SCS, wherein:
a value from the set of values indicates a number of more than one consecutive slots and a number of one or more consecutive slots for a SCS from the set of SCS, and
the first number of more than one consecutive slots and the second number of one or more consecutive slots correspond to a first value from the set of values for the first SCS.

19. The method of claim 17, further comprising:
determining a first number of search space sets from the one or more search space sets, wherein:
the first number of candidate PDCCH receptions are for the first number of search space sets,
each of the one or more search space sets has an index, and
each search space set from the first number of search space sets has a smaller index than any search space set from the one or more search space sets that is not from the first number of search space sets.

20. The method of claim 15, further comprising:
transmitting an indication for a time offset;
receiving a configuration for at least two search space set groups;
determining a first candidate PDCCH reception from the first number of candidate PDCCH receptions provides a downlink control information (DCI) format, wherein the DCI format includes a field with a value indicating a search space set group from the at least two search space set groups; and
receiving a second number of candidate PDCCHs according to the search space set group after the time offset from a last symbol of the first candidate PDCCH reception.

* * * * *